US006570780B2

(12) United States Patent
Furukawa et al.

(10) Patent No.: US 6,570,780 B2
(45) Date of Patent: May 27, 2003

(54) RESONANT INVERTER CONTROL SYSTEM

(75) Inventors: Katsuhiko Furukawa, Utsunomiya (JP); Sadao Shinohara, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/134,535

(22) Filed: Apr. 30, 2002

(65) Prior Publication Data
US 2002/0172062 A1 Nov. 21, 2002

(30) Foreign Application Priority Data

May 17, 2001 (JP) ........................................ 2001-148136
Jun. 27, 2001 (JP) ........................................ 2001-195077

(51) Int. Cl.[7] ........................ H02M 3/24; H02M 7/5387
(52) U.S. Cl. .......................................... 363/98; 363/132
(58) Field of Search .............................. 363/16, 17, 95, 363/97, 98, 131, 132

(56) References Cited

U.S. PATENT DOCUMENTS

| 5,047,913 | A | | 9/1991 | De Doncker et al. ......... 363/95 |
| 5,594,634 | A | * | 1/1997 | Rajashekara et al. ......... 363/98 |
| 5,642,273 | A | | 6/1997 | Lai et al. ....................... 363/56 |
| 5,710,698 | A | | 1/1998 | Lai et al. ....................... 363/56 |
| 5,717,584 | A | * | 2/1998 | Rajashekara et al. ......... 363/98 |
| 6,069,809 | A | * | 5/2000 | Inoshita ........................ 363/98 |
| 6,337,801 | B2 | * | 1/2002 | Li et al. ....................... 363/127 |

* cited by examiner

Primary Examiner—Matthew Nguyen
(74) Attorney, Agent, or Firm—Armstrong, Westerman & Hattori, LLP

(57) ABSTRACT

An inverter control apparatus is provided which controls a resonant soft switching inverter circuit according to the operational principle that the number of the resonant inductors be reduced. When the three phase control signal of the control CPU 5 changes from the (1, 0, 0) state to (0, 0, 1), the drive signal generating device 6 causes a current to flow to the inductor Lr by making the auxiliary switching elements conductive, and when the current I4 flowing to the inductor Lr is the same as the maximum among the currents I1, I2, and I3 flowing through the load, turns OFF the IGBT Q1 and IGBT Q6. Next, the voltage sensors Vs2 and Vs5, which are connected to the IGBTs Q2 and Q5 of the main switching circuit, detect whether or not the voltage across the collector terminal and emitter terminal has become "zero", and when the outputs Z2 and Z5 of the zero voltage detecting device 8 output the respective logical values "1", the device signal generating device 6 outputs the switching control signals S2 and S5 that force the IGBTs Q2 and Q5 to conduct, and transit to a stationary condition.

7 Claims, 16 Drawing Sheets

MODE 1

MODE 2

MODE 3

MODE 4

MODE 5

MODE 6

MODE 7

MODE 8

MODE 9

FIG. 8A

POSSIBILITY OF OUTPUT OF VECTOR

| VECTOR<br>Us Vs Ws | EXCLUSIVE<br>LOGICAL | OUTPUT POSSIBLE<br>OR NOT |
|---|---|---|
| 0 0 0 | 0 | OUTPUT POSSIBLE OR NOT |
| 0 0 1 | 1 | OUTPUT POSSIBLE |
| 0 1 0 | 1 | OUTPUT POSSIBLE |
| 0 1 1 | 1 | OUTPUT POSSIBLE |
| 1 0 0 | 1 | OUTPUT POSSIBLE |
| 1 0 1 | 1 | OUTPUT POSSIBLE |
| 1 1 0 | 1 | OUTPUT POSSIBLE |
| 1 1 1 | 0 | OUTPUT POSSIBLE OR NOT |

FIG. 8B

TRANSITION DUE TO AGREEMENT OF LOGICAL SUM OF VECTORS

| INITIAL VECTOR<br>Us Vs Ws | VECTOR THAT CAN TRANSIT | | LOGICAL<br>SUM |
|---|---|---|---|
| | (1) Us Vs Ws | (2) Us Vs Ws | |
| 0 0 1 | 0 1 0 | 1 0 0 | 1 |
| 0 1 0 | 0 0 1 | 1 0 0 | 1 |
| 0 1 1 | 1 0 1 | 1 1 0 | 2 |
| 1 0 0 | 0 0 1 | 0 1 0 | 1 |
| 1 0 1 | 0 1 1 | 1 1 0 | 2 |
| 1 1 0 | 0 1 1 | 1 0 1 | 2 |

FIG. 8C

TRANSITIONS OF VECTORS DUE TO LOGICAL INVERSION

| INITIAL VECTOR<br>Us Vs Ws | VECTOR THAT CAN TRANSIT<br>Us Vs Ws |
|---|---|
| 0 0 1 | 1 1 0 |
| 0 1 0 | 1 0 1 |
| 0 1 1 | 1 0 0 |
| 1 0 0 | 0 1 1 |
| 1 0 1 | 0 1 0 |
| 1 1 0 | 0 0 1 |

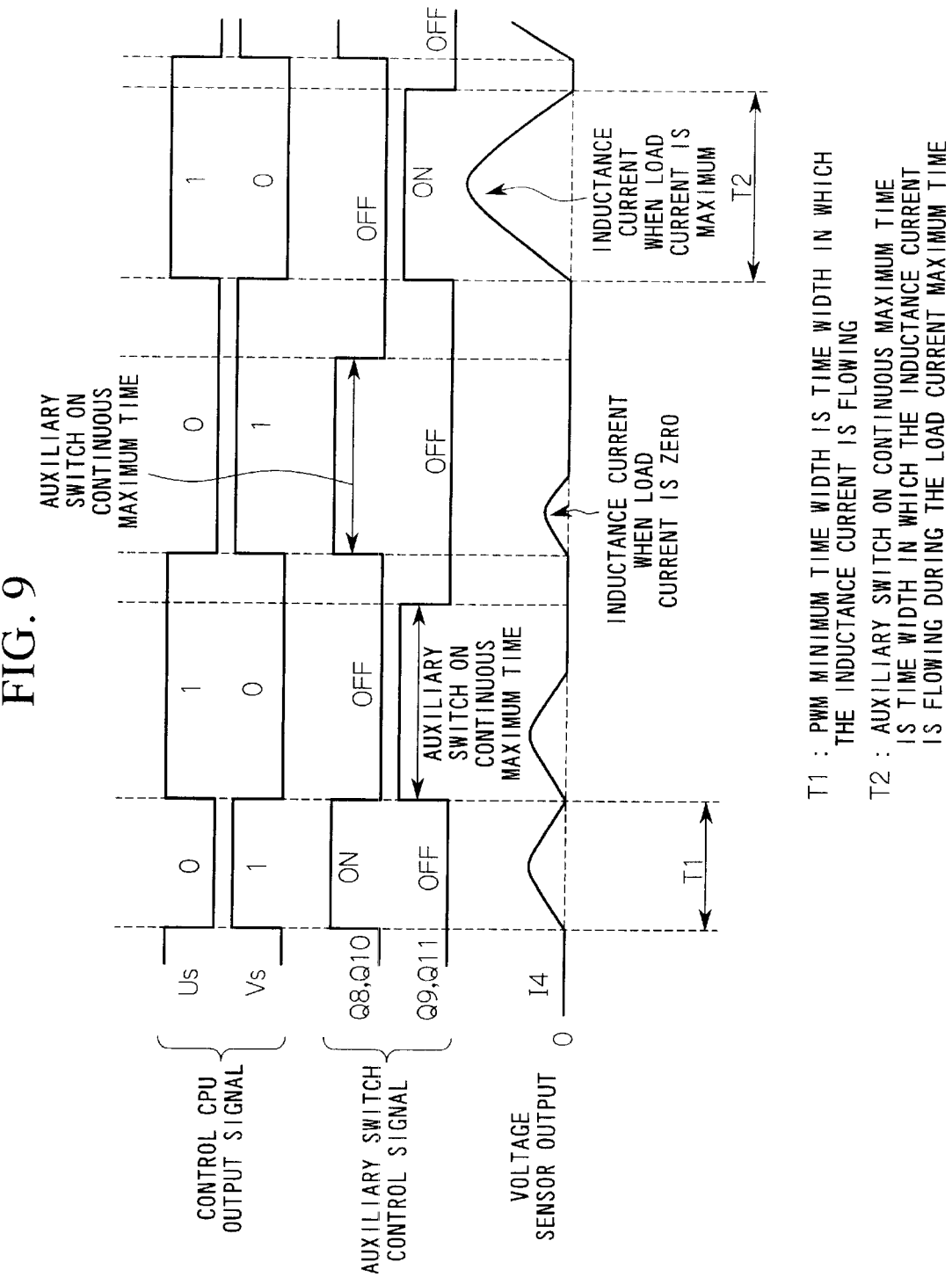

RESONANT INVERTER CONTROL SYSTEM

BACKGROUND OF THE INVENTION

1. Field of the Invention

The present invention relates to an inverter control system that controls an inverter circuit in order to drive a load such as a motor, in particular, relates to a resonant inverter control system that controls an inverter circuit provided with snubber capacitors for carrying out soft switching, and also relates to a resonant inverter apparatus that carries out soft switching in order to drive a motor used in an electric vehicle (EV), a hybrid vehicle (HEV), or the like.

2. Description of the Related Art

Technology for conventional inverter circuits for driving a load such as a motor is disclosed in U.S. Pat. Nos. 5,710,698, 5,642,273, and 5,047,913. According to these patents, as shown in FIG. 15, for example, a conventional example of a soft switching inverter comprises an inverter part using as switching elements IGBTs (insulated gate bipolar transistors) Q101 to Q106 connected to the motor 1, which comprises a three phase induced motor or a direct current brushless motor that serves as a load.

In the inverter, the IGBT Q101 to Q106 are connected at both terminals of the direct current power source 3 to form a three-phase bridge structure comprising a U phase, a V phase, and a W phase, and free wheeling diodes (FWD) D101 to D106 are connected between the collector terminals and emitter terminals of each of the IGBTs, with the object of circulating the regeneration energy that the load of the inductance of the motor 101 generates and the current energy accumulated in the load of the inductance. In addition, snubber capacitors C101 to C106, which are for absorbing a surge voltage applied across the collector terminal and the emitter terminal of the IGBTs during the turn-ON and turn-OFF of the IGBTs, are also connected between the collector terminals and emitter terminals of each of the IGBTs.

Furthermore, in the inverter, a smoothing capacitor C109 is connected to the direct current power source 103, and at the connection points of the center-taped voltage maintaining capacitors C107 and C108 that are connected serially to both terminals of the smoothing capacitor C109, from the respective connecting points of the U phase snubber capacitors C101 and C102, the V phase snubber capacitors C103 and C104, and the W phase snubber capacitors C105 and C106, bi-directional switch units SU101 to SU103 for running resonant current via the inductor are respectively connected to the inductor L101 that resonates with the snubber capacitors C101 and C102, the inductor L102 that resonates with the snubber capacitors C103 and C104, and inductor L103 that resonates with the snubber capacitors C105 and C106.

The structure described is also called an auxiliary freewheeling arm linked snubber inverter, and in the soft switching inverter having the structure described above, when, for example, the IGBT Q102 is to be turned ON slightly after the IGBT Q101 is to be turned OFF, the charging current of the snubber capacitor C101 and the discharge current of the snubber capacitor C102 flow to the center-taped voltage maintaining capacitors C108 and C108 via the inductor L101, and at the same time, when the IGBTs Q103 and Q105 are to be turned ON slightly after the IGBTs Q104 and Q106 are to be turned OFF, the charging current of the snubber capacitors C104 and C106 and the discharge current of the snubber capacitors C103 and C105 is supplied from the center-taped voltage maintaining capacitors C107 and C108 via the inductors L102 and L103.

Therefore, the snubber capacitor will charge and discharge due to the resonant current of the snubber capacitor and the inductor, and thus in the case that the IGBT turns OFF and the snubber capacitor is charged, because of the delay in the rise of the voltage applied to the IGBT provided by the snubber capacitor due to the time constant, ZVS (Zero Voltage Switching) of the IGBTs is realized. In contrast, in the case that before the IGBT is turned ON the snubber capacitor discharges, the voltage and current applied to the IGBTs due to the free wheeling diode conduction falls to zero. Thereby, the loss that occurs during the turn-ON and the turn-OFF of the switching elements can be reduced because ZVS (Zero Voltage Switching) and ZCS (Zero Current Switching) of the IGBTs are realized.

FIG. 16 is also a conventional example of a soft switching inverter, also called an auxiliary resonant AC linked snubber inverter, and like the auxiliary resonant commutation arm linked snubber inverter in FIG. 16, comprises an inverter part in which the IGBTs Q101 to Q106 connected to free wheeling diodes D101 to D106 and snubber capacitors C101 to C106 are connected at both terminals of the direct current source 103 to form a three-phase bridge structure comprising a U phase, a V phase, and a W phase and a structure wherein the inductor L104 that resonates with the snubber capacitors C101 and C102, the inductor L105 that resonates with the snubber capacitors C103 and C104, and the inductor L106 that resonates with the snubber capacitors C105 and C106 are respectively connected between the connecting point between the U phase snubber capacitors C101 and C102, the connection point between the snubber capacitors C103 and C104 of the V phase, the connecting point between the snubber capacitors C105 and C106 of the W phase of the inverter and the bi-direction switching units SU104 to SU106 for providing a resonant current to flow via the inductors.

The difference in operation between the auxiliary resonant AC linked snubber inverter in FIG. 16 and the auxiliary resonant snubber inverter in FIG. 15 is only the paths of the current that charges and discharges the snubber capacitor, and the principle that the IGBTs, which comprise each of the switching elements, attain ZVS and ZCS is identical.

In the conventional example of a soft switching inverter such as that described above, forming the resonant circuit by snubber capacitors and each of the inductors is effective for making the loss during the turn ON and the turn OFF that occurs in the switching elements small because the current flowing to the IGBTs (switching elements) and the voltage applied to the IGBTs can be controlled.

However, because the core capacity required by the inductors is determined by the conducting peak current, the weight of the inductors and the volume of the inductors increases along with an increase in the controlled load current, and in particular, in the conventional example of the soft switching inverter that required three inductors through which a current equal to or greater than the load current can flow, there are the problems that decreasing the weight and down-sizing are not possible due to the increase in the weight and volume of the inductors.

In addition, clearly decreasing the weight and down-sizing is most effectively attained by reducing the number of inductors, but in carrying out soft switching after the number of inductors have been reduced, inverter control that is different from conventional technology is required, and thus there is the problem that the control device must be clarified.

In consideration of the problems described above, an object of the first embodiment of the present invention is to provide a resonant inverter control apparatus that can concretely control the resonant inverter having a reduced number of resonant inductors according to this operating principle to realize soft switching.

Furthermore, in a soft switching inverter apparatus of the first embodiment, during the turn-ON operation and turn-OFF operation of the main switching elements, by establishing resonance across the resonant inductor in the auxiliary circuit and the resonant capacitors connected in parallel to the main switching elements, the slope of the change of the voltage across terminals of the main switching elements becomes gentle and soft switching is realized.

However, in the case that the main switching elements are turned OFF from the state in which the main switching electrodes conduct a current, because immediately before the turn-OFF a load current was conducted to the main switching elements, even if more resonant current does not flow due to the auxiliary circuit, the charging and discharging of the capacitors between the terminals of the main switching elements are possible.

At the time that the current is conducted to the main switching element, when the auxiliary circuit is forced to conduct, the auxiliary circuit is connected in parallel to the load. Thereby, the equivalent increase in the current due to the auxiliary circuit being forced to conduct is superimposed on the load current flowing to the main switching element, and due to this increase in the current, the conducting loss of the main switching element increases.

Therefore, an object of the second embodiment of the present invention is to provide an inverter apparatus having a smaller loss than conventional technology and has a high efficiency.

SUMMARY OF THE INVENTION

According to the first aspect of the present invention, a resonant inverter control apparatus that controls an inverter circuit comprises six main switching elements (for example, IGTQ1 to IGTQ6 in the embodiments) connected to form a three-phase bridge; six free wheeling diodes (for example, free wheeling diodes D1 to D6 in the embodiments) and six snubber capacitors (for example, snubber capacitors C1 to C6 in the embodiments) respectively connected in parallel between two terminals of the main switching elements that are made conductive or non-conductive by the switching control; main switching circuits in which each of the connection points between three groups of main switching circuits that form each phase of a three phase bridge structure (for example, a bridge circuit 2B1 in the embodiments) connected serially by pairs to each end of a power source serve as three phase output terminals for connecting the load (for example, the motor in the embodiments); and an auxiliary switching circuit in which six auxiliary switching elements that force current to flow in one direction are connected to form a three phase bridge connection and resonant inductances (for example, resonant inductance Lr in the embodiments) is connected to the bridge circuit (for example, the bridge circuit 2B1 in the embodiments) that respectively connects each connection point between said auxiliary elements to said three phase output terminals, comprising, a three phase control device (for example, the control CPU 5 in the embodiments) that outputs a three phase control signal that serves as a reference for controlling said main switching elements of said inverter circuit, six voltage measuring devices (for example, voltage sensors Vs1 to Vs6 in the embodiments) that measure the voltage across two terminals of said main switching element, zero voltage detecting device (for example, zero voltage detecting device 7 in the embodiments) that detects that the voltage across any two terminal of said six main switching elements is zero by the output of said voltage measuring device, four current measuring devices (for example, current sensors Is1 to Ts4 in the embodiments) that respectively measures the three phase current flowing to said load and the induced current flowing to said inductors, a resonant current arrival determining device (for example, a resonant current arrival determining device 8 in the embodiments) that calculates the absolute value of the maximum value of said three phase current and whether or not the induced current is larger than this maximum value based on the output of said current measuring device, and a drive signal generating device (for example, a drive signal generating device 6 in the embodiments) in which a switching control signal that forces conduction across said two terminals of said main switching element is output when the zero voltage detecting device detects that a voltage across said two terminals of the switching elements to be controlled is zero based on the control by said three phase control signal, and a switching control signal that interrupts the conduction across said two terminals of said main switching element that is the phase of the main switching element corresponding to this maximum value and has two terminals in a conducting state is output when said resonant current arrival determining device has determined that said induced current is larger than the absolute value of the maximum value of said three phase current.

By constructing the resonant inverter control apparatus as described above, by using the resonant current arrival determining device, whether the induced current is larger than the load current is detected, a turn OFF operation is carried out on the main switching element that is currently in a conducting state, the zero voltage detecting means then detects that the voltage across the terminals of a main switching element that resonates with the snubber capacitor and inductors has fallen to zero, and next a turn ON operation of the main switching elements which are currently in a non-conducting state connected serially to the main switching elements that are turned OFF is carried out. Therefore, in the turned OFF main switching elements, ZVS and ZCS can be realized, and thus control becomes possible that reduces the loss in the inverter circuit to a minimum.

According to the second aspect of the present invention, in the resonant inverter control apparatus, when, in the inverter control apparatus in the first aspect, the main switching elements are separated into first, second, and third upper level switching elements (for example IGBT Q1, Q3, and Q5 in the embodiment) corresponding to each phase of the three phase bridge and fourth, fifth, and sixth lower level switching elements (for example, IGBT Q2, Q4, and Q6) corresponding to each phase of the three phase bridge, and the auxiliary switching elements are separated into the seventh, eighth, and ninth switching elements (for example, IGBT Q7, Q9, and Q11 in the embodiment) that are respectively connected to the three phase output terminals that conduct only in the direction in which the current flows to each of the connecting points between the auxiliary switching elements, and the tenth, eleventh, and twelfth switching elements (for example, IGBT Q8, Q10, and Q12) that are respectively connected to the three phase output terminals that conduct only in the direction in which the current flows out from each of the connection points between the auxiliary switching elements, the drive signal generating device outputs switching control signals that force the seventh, eighth, and ninth switching elements to conduct in synchronism with a three phase control signal that directs the output of a switching control signals that force the first, second, and third switching elements to conduct, and outputs switching control signals that force the tenth, eleventh, and twelfth switching elements to conduct in synchronism with the three phase signals that direct the output of switching signals that force the fourth, fifth, and sixth switching elements to conduct.

By constructing the resonant inverter control apparatus as described above, by using the control signals for controlling the main switching elements, it is possible to simply control an auxiliary switching element by controlling only one resonant inductor using the control signals for controlling the main switching elements.

According to the third aspect of the invention, in the above resonant inverter control apparatus, for the signals of each phase of the three phase control signal, when the case in which the switching control signal forces conduction across the two terminals of the first, second, and third switching elements and the interrupts the conduction across the two terminal of the fourth, fifth, and sixth switching elements is represented by the logical value "1" and the case in which the switching control signals force conduction across the two terminals of the fourth, fifth, and sixth switching elements and interrupts the conduction across the two terminals of the first, second, and third switching elements is represented by the logical value "0", the exclusive logical OR of the logical values representing the three phase signals of the three phase control signal output by the three phase control device is always the logical value "1".

By constructing the resonant inverter control apparatus as described above, the resonance operation by the snubber capacitors and inductors can be reliably activated, and in the control of a three phase inverter circuit, the combination state of the signals for each phase of the three phase control signals becomes (Us, Vs, Ws)=(0, 0, 0) or (1, 1, 1), and thereby the occurrence of hard switching can be suppressed.

According to the fourth aspect of the present invention, in the above inverter control apparatus according to the third aspect, the state transitions of the three phase control signals output from the three phase control device satisfy either the case that the logical OR of the logical values that represent the signals for each of the phases of the three phase control signals after the state transition are identical to the logical OR of the logical values that represent the signals for each of the phases of the three phase signal after the state transition, or the case in which the logical values that represents the signals of each of the phases of the three phase control signals after state transition are inversions of the logical values representing the signals of each of the phases of the three phase signals after the state transition.

By constructing the resonant inverter control apparatus as described above, the resonance operation by the snubber capacitors and inductors can be reliably activated, and in the control of a three phase inverter circuit, before and after the state transitions of the three phase control signals, for example, transiting from (Us, V, Ws)=(1, 0, 0) to (Us, Vs, Ws)=(1, 1, 0), and thereby, it is possible to suppress the occurrence of hard switching due to only the signal for one phase among the three phases not changing.

According to the fifth aspect of the present invention, in the above inverter control apparatus, when the output time during which the three phase control device continues to output identical three phase signals is greater than the time during which the induced current flows through the inductors, and the maximum time of the conduction continuation time of the auxiliary switching element is equal to or less than the time during which the induced current flows through the inductors when any of the three phase currents is flowing at a maximum, the drive signal generating device outputs to the auxiliary switching element in a non-conducting state a switching control signal that forces the auxiliary switching element to conduct in synchronism with the three phase control signal that directs the output of a switching control signal to the main switching element, or outputs a switching control signal to the auxiliary switching elements in a conducting state a switching control signal that forces the interruption of conduction of the auxiliary switching elements when the maximum time of the conducting continuation time of the auxiliary switching element has been attained in the case that the output time of the three phase control signal is longer than the maximum time for the conduction continuation time of the auxiliary switching elements, or outputs a switching control signal that forces the interruption of the conduction of the auxiliary switching elements in synchronism with the three phase control signal that directs the output of the switching control signals to the main switching elements in the case that the output time of the three phase control signal is shorter than a maximum time for the conduction continuation time of the auxiliary switching elements.

By constructing the inverter control apparatus as described above, the switching operation in the auxiliary switching elements is carried out when current is not flowing in the auxiliary switching elements, that is, ZCS can be realized with auxiliary switching elements.

According to the sixth aspect of the present invention, is a resonant inverter control apparatus comprising an inverter circuit (the main circuit 2A in the embodiment) in which a direct current output by a power source (power source VB in the embodiment) is converted to a three phase alternating current and supplied to a three phase motor (the motor 1 in the embodiment), a resonant circuit (auxiliary circuit 2B in the embodiment) that is connected to the output terminal of the inverter circuit, and a control circuit (control circuit 3 in the embodiment) that control the resonant circuit and the inverter circuit. The inverter circuit comprises three phase main circuits connected in parallel to three circuits, one for each phase, wherein a main switching element (for example, the main switching element Q1 in the embodiment) that is connected to the plus terminal of the power source and the main switching elements (for example, the switching element Q2 in the embodiment) that are connected to the minus terminal of the power source are connected in series, and connected in parallel to diodes (for example, diodes D1 and D2 in the embodiment) respectively connected to these two main switching elements; capacitors (capacitors C1 to C6 in the embodiment) that are connected in parallel to the main switching elements in each of the circuits for each phase; load current sensors (load current sensors Is1, Is2, and Is3 in the embodiment) that detect a load current (I1, I2, and I3 in the embodiment) flowing across main connection points (main connection points PSU, PSV, and PSW in the embodiment), at which two main switching elements in each of the circuits for each phase are connected together, and the motor; and cross-terminal voltage sensors (the cross-terminal voltage sensors Vs1 to Vs6 in the embodiment) that detect the cross-terminal voltage (the cross-terminal voltages V1 to V6 in the embodiment) of the main switching elements in the each of the circuits for each phase. The resonant circuit comprises auxiliary connection points (the auxiliary connection points PHU, PHV, and PHW in the embodiment) in which three auxiliary circuits, one for each phase (for example, the auxiliary circuit for the phase 3U), connected serially to two auxiliary switching elements (for example, auxiliary switching element blocks B7 and B8 in the embodiment) that allow a current to pass only in one direction are connected in parallel, and two auxiliary switching elements in each of the auxiliary circuits for each phase are connected together; three phase auxiliary circuits connected to the main connection points of the inverter circuit; resonant inductors (the inductor Lr in the embodiment) connected between the auxiliary connection points in the auxiliary circuits for each phase and the terminals on the opposite side; and a resonant current sensor (resonant current sensor Is4 in the embodiment) that detects a resonant current (the resonant current I4 in the embodiment) flowing to the inductor. The control circuit comprises a zero voltage detecting device (the zero voltage detecting device 8 in the embodiment) that detects whether or not the cross-terminal voltage detected by each of the cross-terminal voltage sensors is zero and outputs a zero voltage detection signals (the zero voltage detection signals z1 to z6 n the embodiment) that corresponds to each of the cross-terminal voltages in the case that they are zero; a resonant current arrival determining device (the resonant current arrival determination device 7 in the embodiment) that determines whether or not the resonant current detected by the resonant current sensors is larger than the load current detected by the load current sensors and in the case that they are larger outputs an arrival determination signal (the arrival determination signal I in the embodiment); a drive signal generating device (the drive signal generating device 6) that generates a main drive signal (the main drive signals S1 to S6 in the embodiment) that turns OFF the main switching elements to a non-conducting state when the resonant current arrival determination device has output an arrival determination signal, generates a main drive signal that turns ON the main switching elements to a conducting state when the zero voltage detecting device has output a zero voltage detection signal corresponding to each cross-terminal voltage, generates an auxiliary drive signal (auxiliary drive signals S7 to S12) that turn ON the auxiliary switching elements at a predefined switching timing, and turns OFF an auxiliary switching element that is in a conducting state after a predetermined on continuation time has passed from the predefined switching timing; and current conducting device determining devices (the current conducting device discrimination devices 16U, 16V, and 16W) that determine whether or not a current is flowing in any of the main switching elements or diodes in each of the circuits for each phase in the inverter circuit. The drive signal generating device comprises a resonant action prohibiting device (the resonant operation prohibiting device 17 in the embodiment) that prohibits the generation of an auxiliary drive signal that turns ON a corresponding auxiliary switching element in the resonant circuit during the turn-OFF of the main switching element in the case that the current conducting device determination device has determined that a current is flowing in a main switching element.

According to the structure described above, the current conducting device determination device determines whether there is a current flowing in any of the main switching elements or diodes in each of the main circuits for each phase in the inverter circuit, and the resonant action prohibiting device prohibits the generation of an auxiliary drive signal that turns ON a corresponding auxiliary switching element in the resonant circuit while the main switching element is turning OFF in the case that the current conducting device determination device has determined that a current is flowing in a main switching element.

Therefore, soft switching control becomes possible without an unnecessary resonant current flowing. Thereby, the loss in the main switching elements, the auxiliary switching elements, and the resonant inductors can be greatly reduced and the efficiency increased.

In addition, in a collective resonant snubber inverter, because two phase switching in the resonant operation is necessary in the resonance operation and one phase switching is impossible, in space vector control, the 6 output voltage vectors V1 (1, 0, 0), V2 (0, 1, 0), V3 (1, 1, 0), V4 (0, 0, 1), V5 (1, 0, 1) and V6 (0, 1, 1), whose angles differ from each other by $\pi/3$ [rad] and which are represented by the three phase control signals depending on the pattern of the switching control, are switched and output depending on the pattern of the switching control of the inverter circuit. During the switching of the output voltage vector, a reverse voltage vector in which the output voltage vectors before switching and after switching differ by a $\pi$[rd] angle is output at a predetermined time, and subsequently the output voltage vector must be output after switching. In this switching of the output voltage vector, there is the restriction that it cannot be switched to the neighboring output voltage vector. However, according to the structure described above, because the operation of the resonant circuit is prohibited, the reverse voltage vector is not output, switching with only one phase becomes possible, switching the neighboring output voltage vector becomes possible, and thus the degree of freedom of the control improves.

According to the seventh aspect of the present invention, the current conducting device determining device of the first aspect comprises a current conduction direction determining device (the current conduction direction determining device 18 in the embodiment) that determines the direction that a load current detected by a load current sensor is flowing; and a logic processing device (the logic processing device 19 in the embodiment) that determines whether or not a current is flowing in any of the main switching elements or diodes in each of the main circuits for each phase in the inverter circuit based on the direction in which the load current determined by this current conduction direction determining means is flowing and the main drive signal generated by the drive signal generating device.

According to the above structure, the current conduction direction determination determines the direction that a load current detected by a load current sensor is flowing and the logic processing device determines whether or not a current is flowing in any of the main switching elements or diodes in each of the main circuits for each phase in the inverter circuit based on the direction in which the load current determined by this current conduction direction determining means is flowing and the main drive signal generated by the drive signal generating device.

BRIEF DESCRIPTION OF THE DRAWINGS

FIGS. 8A, 8B, and 8C are drawings showing the state transitions of the three phase control signal of the inverter control apparatus of the same embodiment.

FIG. 9 is a drawing showing the time relationships of the control signals of the inverter control apparatus of the same embodiment.

DETAILED DESCRIPTION OF THE INVENTION

First Embodiment

Below, a first embodiment of the present invention will be explained with reference to the drawings.

Figure 1:
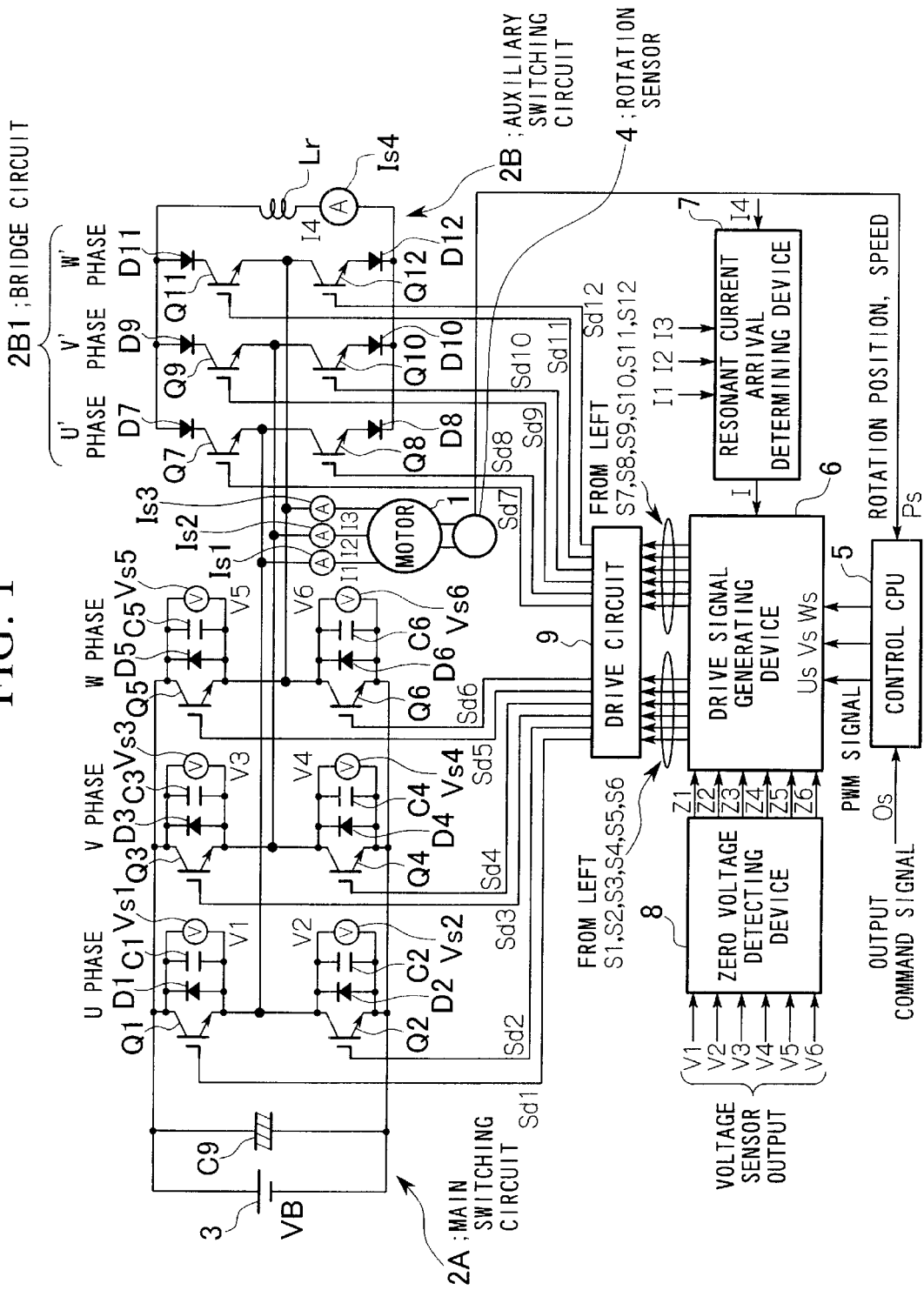
FIG. 1 is a circuit diagram showing an embodiment of the present invention.

FIG. 1 is a circuit diagram showing an embodiment of the present invention.

In FIG. 1, the inverter circuit controlled by the inverter control apparatus of the present invention comprises a main switching circuit 2A that forms an inverter part using, for example, IGBTs Q1 to Q6 as main switching elements and an auxiliary switching circuit 2B that forms a resonant part comprising auxiliary switching elements using, for example, the IGBTs Q7 to Q12 as unidirectional switching elements and a resonant inductor Lr, both of which are connected to a three phase motor 1 that serves as a load. Moreover, the elements used in Q1 to Q12 as switching elements are not limited to IGBTs, but reverse blocking thyristors, GOTs (gate turn OFF thyristors), bipolar transistors, MOSFETs can also be used, and an induction motor or a direct current brushless motor can be used for the motor 1.

In addition, the main switching circuit 2A connects IGBTs Q1 to Q6 to both terminals of a direct current source to form a three phase bridge structure comprising a U phase, V phase, and a W phase, and the free wheeling diodes D1 to D6 are connected in a form wherein a collector terminal of an IGBT and an anode terminal of the free wheeling diode, and an emitter terminal of the IGBT and a cathode terminal of the free wheeling diode are respectively connected together between the collector terminals and emitter terminals of each of the IGBTs with the object of circulating the regenerative energy generated by the inductive load of the motor 1 or the like and the current energy stored in the inductive load. In addition, the snubber capacitors C1 to C6 for absorbing the surge voltage applied across the collector terminals and emitter terminals of the IGBTs during the turn-ON and turn-OFF of the IGBTs are also connected between the collector terminal and emitter terminal of each of the IGBTs.

In addition, the respective connection points in the main switching circuit 2A between the emitter terminal of IGBT Q1 and the collector terminal of IGBT Q2, the emitter terminal of IGBT Q3 and the collector terminal of IGBT Q4, and the emitter terminal of IGBT Q5 and the collector terminal of IGBT Q6 are the three phase output terminals having a U phase, V phase, and W phase of the inverter circuit of the present invention. These are respectively connected to the U phase, V phase, and W phase of the motor 1, and furthermore, the auxiliary switching circuit 2B is connected to the three phase output terminal of the main switching circuit 2A.

The auxiliary switching circuit 2B connects the bridge circuit 2B1 that connects IGBTs Q7 to Q12 to both terminals of the snubber capacitors C1 to C6 used in the main switching circuit and the resonant inductor Lr that forms a resonant circuit to form a three phase bridge structure comprising a U' phase, a V' phase, and a W' phase (in other words, the resonant inductor Lr is connected on the opposite side of the connection points between the three sets of auxiliary switching elements of the bridge circuit 2B1), and the protective diodes D7, D9, and D11 are respectively serially connected to the collector terminal side of the IGBT Q7, Q9, and Q11 in a form in which the collector terminals of the IGBTs are connected to the anode terminals of the protective diodes. Similarly, the protective diodes D8, D10, and D12 are respectively serially connected to the emitter terminal side of the IGBTs Q8, Q10, and Q12 in a form in which the emitter terminal of an IGBT is connected to the cathode terminal of a protective diode.

In addition, in the connection between the three phase output terminal of the main switching circuit 2A and the auxiliary switching circuit 2B, the terminal of the U phase of the three phase output terminal is connected to the connection point of the IGBT Q7 and the IGBT Q8 that comprise the connection point of the U' phase of the auxiliary switching circuit 2B. Similarly, the terminal of the V phase of the three phase output terminal is connected to the connection point of the IGBT Q9 and IGBT Q10 that comprise the connection point of the V' phase of the auxiliary switching circuit 2B, and similarly the terminal of the W phase of the three phase output terminal is connected to the connection point of the IGBT Q11 and IGBT Q12 that comprise the connection point of the W' phase of the auxiliary switching circuit 2B.

The above is the structure of an inverter circuit in which the conventional three phases of a resonant inductor have been reduced to one, and the inverter control apparatus of the present embodiment comprises a rotation sensor 4 that measures the rotation position and the rotation speed of the motor 1 connected to the inverter circuit in order to control the inverter circuit described above; a control CPU 5 that generates a three phase control signal (PWM signal) by the space vector PWM (pulse width modulation) control method depending on the rotation position and the rotation speed Ps of the motor 1 measured by the rotation sensor 4; a drive signal generating device 6 that generates switching control signals S1 to S12 of each of the switching elements IGBTs Q1 to Q12 of the inverter circuit based on the three phase control signal comprising Us, Vs, and Ws output by the control CPU 5; a resonant current arrival determination device 7 that supplies the turn OFF timing for each of the switching elements IGBTs Q1 to Q6 of the main switching circuit 2A of the inverter circuit to the drive signal generating device 6; a zero voltage detecting device 8 that similarly supplies the turn-ON timing for each of the switching elements IGBTs Q1 to Q6 of the main switching circuit of the inverter circuit to the drive signal generating device 6; and a drive circuit 9 that converts the switching control signals S1 to S12 of each of the switching elements IGBTs Q1 to Q12 of the inverter output by the drive signal generating device 6 to a drive signal for driving the IGBTs.

In addition, in order to measure the current flowing to the load of the inverter circuit and notify the resonant current arrival determining device 7 thereof, the current sensor Is1 is interposed between the U phase terminal of the motor 1 that serves as the load and the U phase output terminals of the of the inverter circuit, and the measured value 11 of the current sensor Is1 is input into the resonant current arrival determining device 7. Similarly, the current sensors Is2 and Is3 are respectively interposed between the V phase terminal and the V phase output terminal and between the W phase terminal and the W phase output terminal of the motor 1 that serves as the load, and the measured value 12 of the current sensor Is2 and the measured value 13 of the current sensor Is3 are input into the resonant current arrival determining device 8. In addition, in order to measure the current flowing to the resonant inductor Lr of the auxiliary switching circuit 2B of the inverter circuit and notify the resonant current arrival determining device 7 thereof, the current sensor Is4 is serially interposed at the resonant inductor Lr, and the measured value 14 of the current sensor Is4 is input into the resonant current arrival determining device 7.

Furthermore, in order to notify the zero voltage detecting device 8 about the operation state of the main switching elements of the inverter circuit, voltage sensors Vs1 to Vs6 that measure the voltage across the collector terminal and the emitter terminal and send the result are connected between the respective collector terminals and emitter terminals of the IGBTs Q1 to Q6 that form the main switching circuit 2A of the inverter circuit, and each of the measured values V1 to V6 of the current censors Vs1 to Vs6 are input into the zero voltage detecting device 8.

Figure 2:
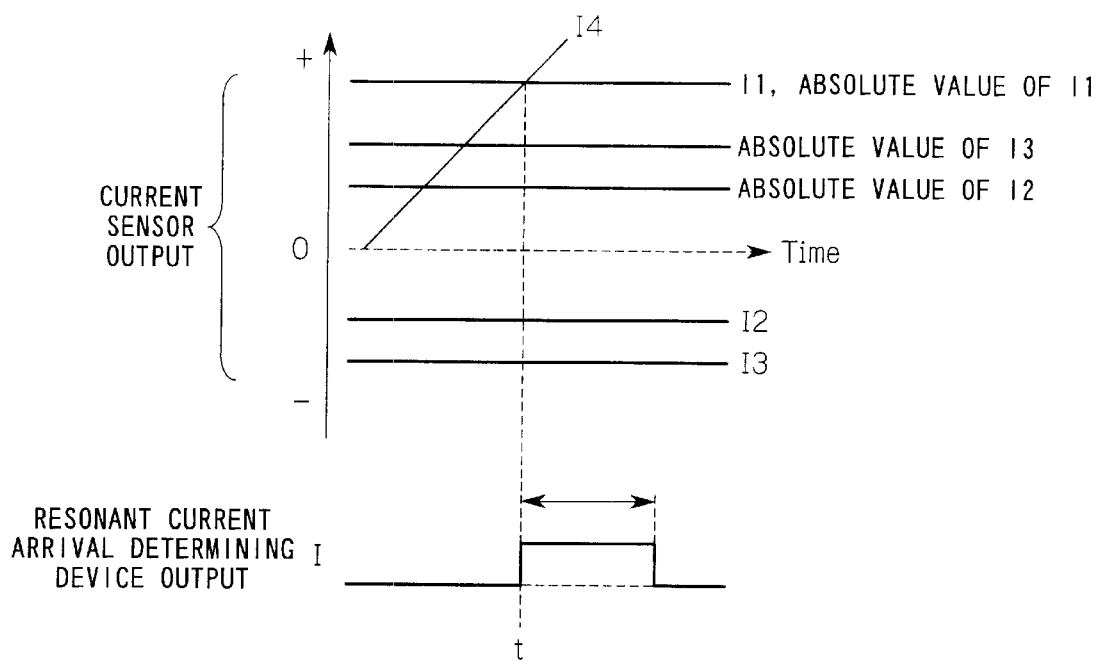
FIG. 2 is a drawing showing the operation of the resonant current arrival determination device of the inverter control apparatus of the same embodiment.

Moreover, the resonant current arrival determining device 7 notifies the drive signal generating device using command value I that the induced current flowing to the resonant inductor Lr is larger than the current showing the maximum value among each of the input load currents I1, I2, and I3. The operation of the resonant current arrival determining device 7 can be further explained using FIG. 2. The direction of the flow of the currents I1, I2, and I3 flowing to the three phase load are changed, the symbol of the command value of the current sensors Is1, Is2, and Is3 output both positive and negative values, and thus in the resonant current arrival determining device 7 the absolute values of the input I1, I2, and I3 are found and compared with the induced current I4. In the example shown in FIG. 2, at time t, at which the absolute value of the load current I1 is at a maximum and the induced current I4 has become identical to the load current I1, the state of the resonant current arrival determining device output is changed, and the pulsed output is output to the drive signal generating device 6 In addition, when the voltages have fallen to zero for each of the input voltage values of the current sensors V1 to V6, the zero voltage detecting device 8 notifies the drive signal generating device 6 by using each of the respective command values Z1 to Z6.

Furthermore, in the drive circuit 9, in order for the control signals that control each of the switching elements of the inverter circuit actually to be able to drive the control terminals of the switching elements, in the case that the switching elements that form the inverter circuit are current drivers such as reverse-blocking thyristors, GTOs, bipolar transistors, or the like, the switching control signal output by the drive signal generating device 6 is converted to a current that can sufficiently drive the control terminal of the switching element. Similarly, in the case that the switching elements that form the inverter circuit are voltage drivers such as IGBTs and MOSFETs, the switching control signal output by the drive signal generating device 6 is converted to a voltage that can sufficiently drive the control terminal of the switching element.

Next, the operation of the inverter circuit of the present embodiment will be explained using the figures. In explaining the operation of the circuit, the voltage and current in each part and the ON/OFF notation of each of the switching elements in the circuit diagram in FIG. 1 will be defined first. First, the voltage and current in each part are defined as follows:

(1) V1 is defined as the voltage applied to both terminals of the parallel circuit of the IGBT Q1, the free wheeling diode D1, and the snubber capacitor C1 where the collector of Q1 serves as the normal direction, and similarly, (2) V2 is defined as the voltage applied to both terminals of the parallel circuits Q2, D2, and C2 where the collector of Q2 serves as the normal direction, (3) V3 is defined as the voltage applied to both terminals of the parallel circuits Q3, D3, and C3 where the collector of Q3 serves as the normal direction, (4) V4 is defined as the voltage applied to both terminals of the parallel circuits Q4, D4, and C4 where the collector of Q4 serves as the normal direction, (5) V5 is defined as the voltage applied to both terminals of the parallel circuits Q5, D5, and C5 where the collector of Q5 serves as the normal direction, and (6) V6 is defined as the voltage applied to both terminals of the parallel circuits Q6, D6, and C6 where the collector of Q6 serves as the normal direction.

Furthermore, the direction in which the three phase currents I1, I2, and I3 that flow to the load are absorbed into the load is defined as the normal direction.

In addition, the definition of the ON/OFF of the IGBTs Q1 to Q6 are as follows. The state in which the IGBT Q1 in the upper level (plus side) of the U phase of the main switching circuit 2A is ON and the IGBT Q2 of the lower level (minus side) is OFF is represented as "1"; the state in which the IGBT Q1 of the upper level of the U phase is OFF and the IGBT Q2 of the lower state is ON is represented as "0"; and similarly, the state in which the EGBT Q3 of the upper level of the V phase is ON and the IGBT Q4 of the lower level is OFF is represented as "1", and the state in which the IGBT Q3 of the upper level of the V phase is OFF and the IGBT Q4 of the lower level is ON is represented as "0". In the W phase, the state in which the IGBT Q5 of the upper level is ON and the IGBT Q6 of the lower level is OFF as well is represented as "1", and the state in which the IGBT Q5 of the upper level is OFF and the IGBT Q6 of the lower level of ON is represented as "0". In addition, in the U' phase of the auxiliary switching circuit 2B, the state in which the EGBT Q7 in the upper level is ON and the IGBT Q8 of the lower level is OFF is represented as "1", and in the U' phase, the state in which the IGBT Q8 of the lower level is ON and the IGBT Q7 of the upper level is ON is represented as "0". Similarly, in the V' phase, the state in which the IGBT Q9 of the upper level is ON and the IGBT Q12 of the lower level is OFF is represented as "1", and in the V' phase, the state in which the IGBT Q10 of the lower level is ON and the IGBT Q11 of the upper level is OFF is represented by "0". In phase W' as well, the state in which the IGBT A11 on the upper level is ON and the IGBT Q12 on the lower level is OFF is represented by "1", and the state in which the IGBT Q12 of the lower level is ON and the IGBT Q11 on the upper level is OFF is represented as "0".

Therefore, for example, when the three phase control signal (Us, Vs, Ws) output by the control CPU is equal to (1, 0, 0), which is the output voltage vector of V1, this indicates the state in which the IGBT Q1 is ON, the IGBT Q2 if OFF, the IGBT Q3 is OFF, the IGBT Q4 is ON, the IGBT Q5 is OFF, and the IGBT Q6 is ON.

In addition, the switching control signal for each of the switching elements of the inverter circuit output by the drive signal generating device 6 denotes an conduction interruption by "0" and conduction by "1".

Figure 3:
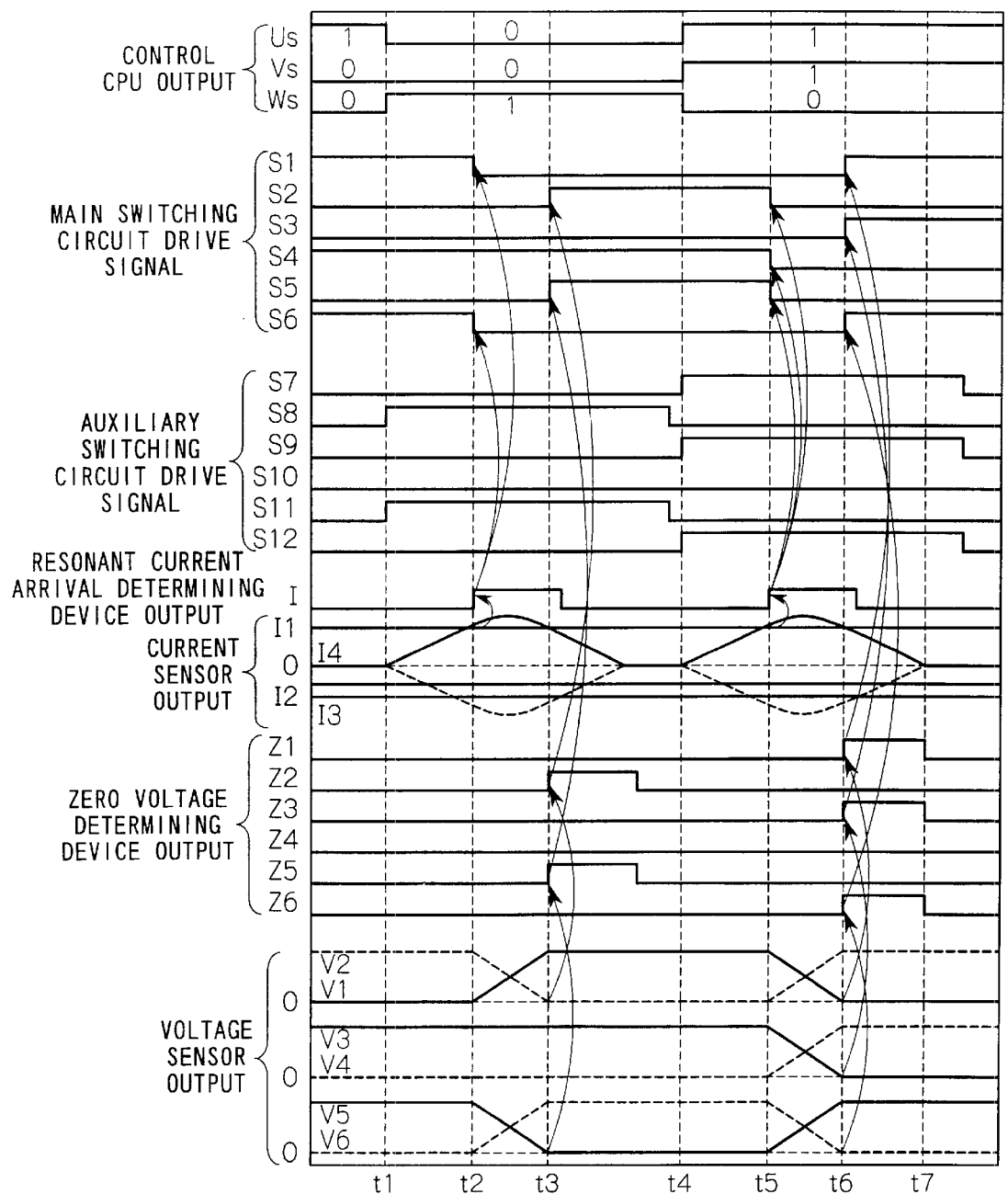
FIG. 3 is a waveform diagram showing the change in the waveform in each part of the inverter control apparatus with respect to time of the same embodiment.

Furthermore, the operation shown in FIG. 3 is one example for explaining the control mode of the inverter circuit of the present embodiment, and the case in which a three phase control signal (three phase control vector) (Us, Vs, Ws) is controlled so as to switch from (1,0, 0) to (0, 0, 1), and then to (1, 1, 0) will be explained. Moreover, the operation of the circuit is also identical to the case of control other than that described above.

The operation of the inverter control apparatus of the present embodiment will be explained with reference to FIG. 3, and FIG. 4 through FIG. 7 based on the definitions of the voltage and current in each part and the ON/OFF of each of the switching elements as defined above.

Figure 4A:
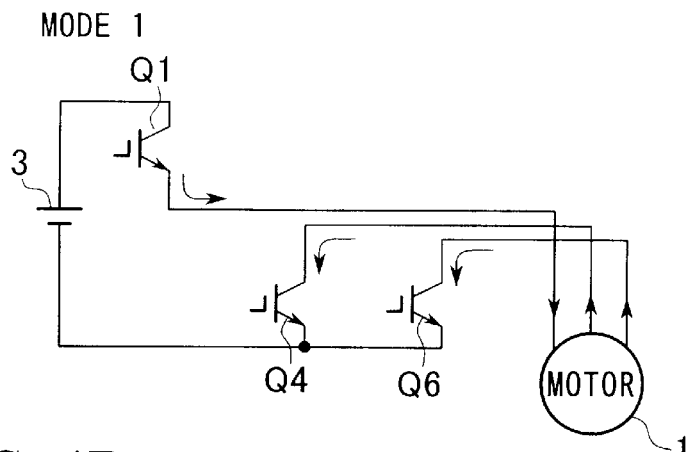
FIGS. 4A, 4B, and 4C are drawings showing the operation for each mode of the inverter circuit of the same embodiment.

First, at time t1, since the stationary state of (U, V, W)=(1, 0, 0), as shown in mode 1 of FIG. 4A, the current flowing towards the U phase element of the motor 1 via the IGBT Q1 from the direct current power source 3 returns to the direct current power source 3 by flowing through each of the IGBTs Q4 and Q6 from the respective V phase element and W phase element of the motor 1. In addition, in the stationary state of the mode 1, the switching elements IGBT Q7, Q9, and Q12 of the auxiliary circuit 2B are in the ON state and the switching elements IGBT Q8, Q10, and Q11 are in the OFF state, but because there is no accumulation of energy in the resonant inductor Lr, the current does not flow to the resonant inductor Lr.

Figure 4B:
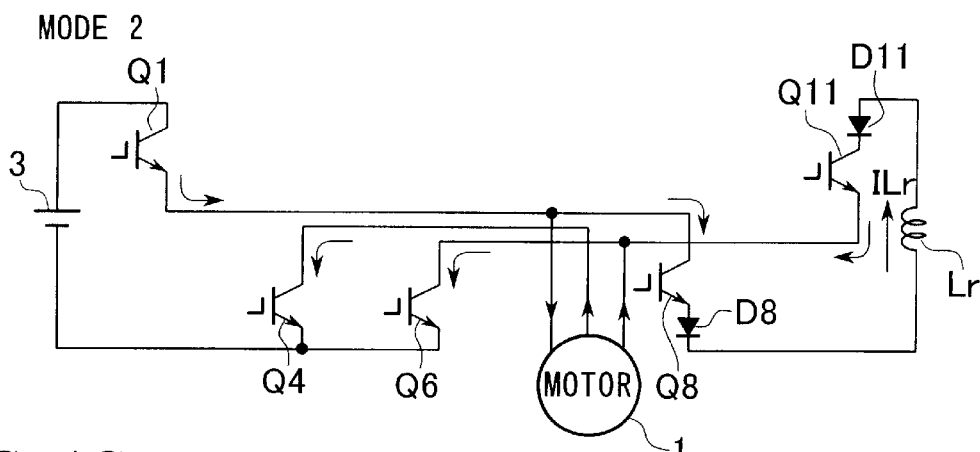

When the control CPU 5 changes the three phase control signal from the stationary state in which (Us, Vs, Ws) is equal to (1, 0, 0), to the state in which the (Us, Vs, Ws) is equal to (0, 0, 1), as shown in mode 3 of FIG. 4B, the drive signal generating device 6 turns the IGBTs Q8 and Q11 ON by switching the logical value of the switching control signals S8 and S11 for IGBTs Q8 and Q11 of the auxiliary switching circuit 2B from "0" to "1". At this time, a portion of the current flowing from the IGBT Q1 to the U phase terminal of the motor 1 flows through the resonant inductor Lr and returns to the direct current power source 3 via the IGBTs Q4 and Q6, and the energy which is the current I1r serving as the initial current, is accumulated in the resonant inductor Lr.

Figure 4C:
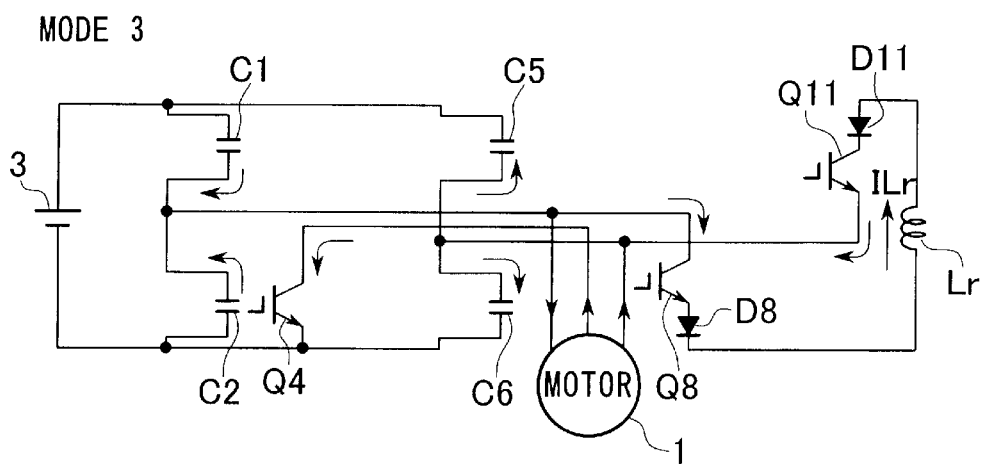

The IGBTs Q8 and Q11 are turned ON, the induced current I4 flows out, and at time t2, when the induced current I4 becomes larger than the absolute value of the maximum value (I1 in the example in FIG. 3) of the load current, the output I of the resonant current arrival determination device changes from a logical value of "0" to "1", and as shown in mode 3 of FIG. 4C, the switching control signals S1 and S5 for the IGBTs Q1 and Q6 of the main switching circuit 2A are changed from a logical value of "1" to "0", and the IGBTs Q1 and Q6 are turned OFF.

At this time, at the IGBTs Q1 and Q6, the voltages V1 and V6 of the collector terminals and the emitter terminals of the IGBTs Q1 and Q6 cannot surge rapidly due to the time constants for each of the snubber capacitors C1 to C6, and thus a ZVS in the IGBTs Q1 and Q6 can be realized.

In addition, when the IGBTs Q1 and Q6 are turned OFF, along with the charging of the snubber capacitors C1 and C6, the voltages V2 and V5 at both terminals of the snubber capacitors C2 and C5 that have had a voltage approximately the same as the power source voltage VB applied until this point in time fall because the discharge of the snubber capacitors C2 and C5 has begun because they are connected to the snubber capacitors C1 and C6. The charging current of these snubber capacitors C1 and C6 and the discharge current of snubber capacitors C2 and C5 revert to the resonant mode in which they circulate the circuit by flowing through the resonant inductor Lr as resonant current.

Furthermore, when this resonant mode continues, more resonant current flows due to the energy accumulated in the resonant inductor Lr, and at the point in time that both terminal voltages V2 and V5 of the snubber capacitors C2 and C5 have substantially fallen to "zero", the energy accumulated in the resonant inductor Lr flows via the free wheeling diodes D2 and D5.

Next, at time t3, the voltage sensors Vs2 and Vs5 which measure the voltage across the collector terminal and emitter terminal of the IGBTs Q2 and Q5 of the main switching circuit 2A detect that the voltage across the collector terminal and emitter terminal of the IGBTs Q2 and Q5 has fallen to "zero", and the outputs Z2 and Z5 of the zero voltage detecting device 8 switch each of the outputs from a logical value of "0" to "1". After receiving this, the drive signal generating device 6 switches the switching control signals S2 and S5 of the IGBTs Q2 and Q5 of the main switching circuit 2A from a logical value of "0" to "1", the IGBTs Q2 and Q5 are switched ON, and transits to the regeneration mode of the (Us, Vs, Ws) that is equal to (0, 0, 1), shown in mode 4 of FIG. 5D. At this time, at the IGBTs Q2 and Q5, the voltages V2 and V5 between the collector terminal and the emitter terminal of the IGBTs Q2 and Q5 is "zero", and due to the state in which a voltage flows to each of the free wheeling diodes D2 and D5, ZVS and ZCS in the IGBTs Q2 and Q5 can be realized.

Figure 5A:
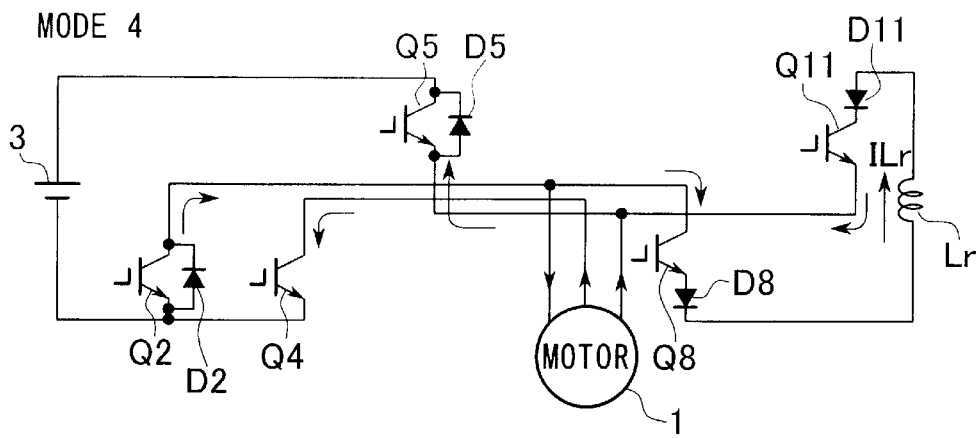
FIGS. 5A, 5B, and 5C are drawings showing the operation for each mode of the inverter circuit of the same embodiment.
Figure 5B:
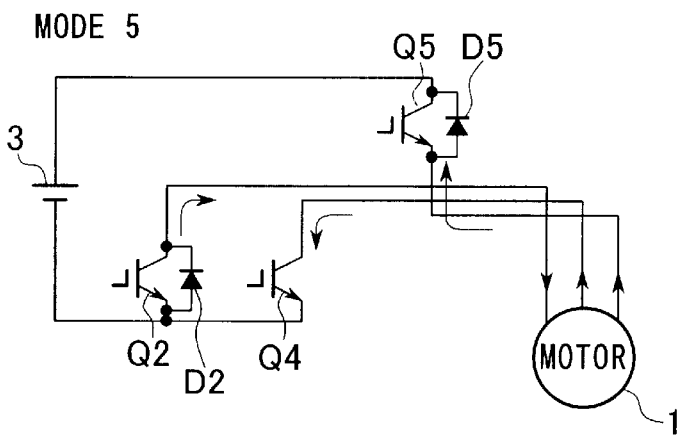
Figure 5C:
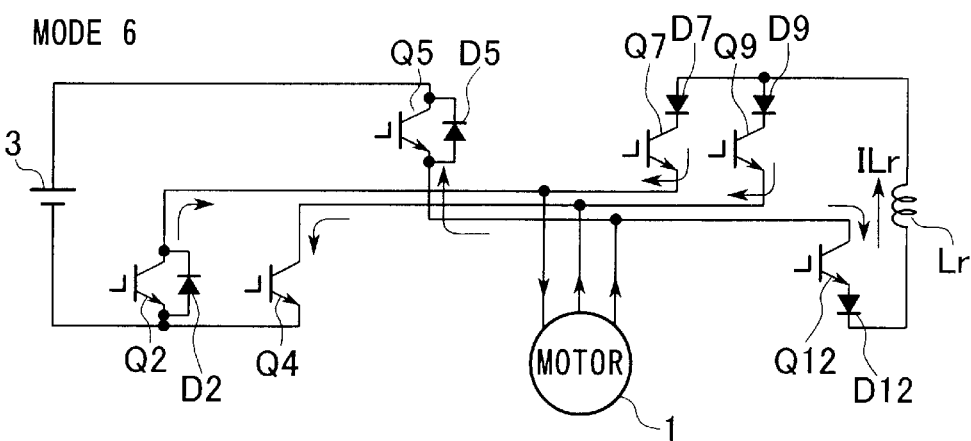

Next, in the regeneration mode 4 shown in FIG. 5D, due to the regeneration energy of the motor 1 and the energy accumulated in the resonant inductor Lr, a regeneration current that flows from the W phase terminal of the motor 1 to the plus side of the direct current power source 3 via the IGBT Q5, a regeneration current that flows from the V phase terminal of the motor 1 to the minus side of the direct current power source 3 via the IGBT Q4, a regeneration current that flows to the U phase terminal of the motor 1 by flowing through the IGBT Q2, and a current that flows to the auxiliary switching element Q8, the resonant inductor Lr, and the auxiliary switching element Q11 are generated.

However, because the power source voltage of the direct current power source is applied to the resonant inductor Lr as a reverse voltage that decreases the current I1r, the current I1r gradually decreases to zero. When the current I1r falls to zero, the current that tries to flow to the emitter side of the auxiliary switching elements Q8 and Q11 due to the power source voltage of the direct current power source 3 is blocked by the protective diodes D8 and D11, and the mode transits to the stationary mode 5 shown in FIG. 5E.

Next, similar to the operation described above, at time t4, when the control CPU 5 changes the three phase control signal from the stationary state where the (Us, Vs, Ws) is equal to (0, 0, 1), to the state where the (Us, Vs, Ws) equal to (1, 1, 0), as shown in mode 6 in FIG. 5F, the drive signal generating means 6 switches the switching control signals S7 and S9 of the auxiliary switching elements Q7, Q9, Q12 of the auxiliary switching circuit 2B from a logical value of "0" to "1", and the auxiliary switching elements Q7, Q9, Q12 are turned ON. When the auxiliary switching elements Q7, Q9, Q12 are turned ON and the inductance voltage I4 flows out, at time t5, the induced current I4 becomes larger than the absolute value of the maximum value (I1 in the example in FIG. 3) of the load current, and the mode becomes the mode 7 shown in FIG. 6G, the output I of the resonant current arrival determination device 7 is switched from a logical value of "0" to "1". Having received this, the drive signal generating device 6 switches the switching control signals S2, S4, S5 for the IGBTs Q2, Q4, and Q5 of the main switching circuit 2A from a logical value of "1" to "0", the IGBTs Q2, Q4, and Q5 are turned OFF, and the mode transits to mode 8 shown in FIG. 6H.

At this time, at the IGBTs Q2, Q4, and Q5, the voltages V2, V4, and V5 between the collector terminal and the emitter terminal of the IGBTs Q2, Q4, and Q5 cannot surge rapidly due to the respective time constants of the IGBTs Q2, Q4, and Q5, and thus ZVS in the IGBTs Q2, Q4, and Q5 is realized.

In addition, when the IGBTs Q2, Q4, and Q5 are turned OFF, and along with the charge voltage of the snubber capacitors C2, C4, and C5, both terminal voltages V1, V3, and V6 of the snubber capacitors C1, C3, and C3 that have had a voltage applied that is approximately equal to the power source voltage VB until this point in time fall because the snubber capacitors C1, C3, and C6 start to discharge because the capacitors C2, C4, and C5 become connected. The charging current of these snubber capacitors C2, C4 and C5 and the discharge current of C1, C3 and C6 circulate in the circuit by flowing through the resonant inductor Lr as resonant current to become in the resonant mode.

Figure 6A:
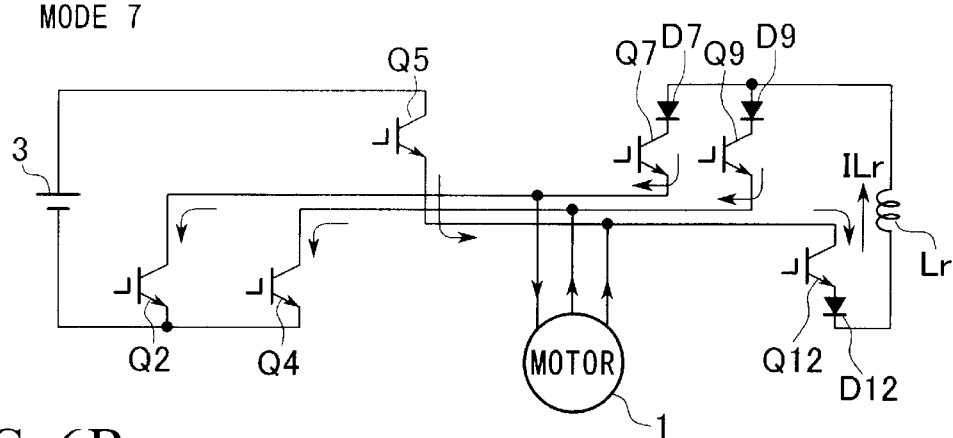
FIGS. 6A, 6B, and 6C are drawings showing the operation for each mode of the inverter circuit of the same embodiment.
Figure 6B:
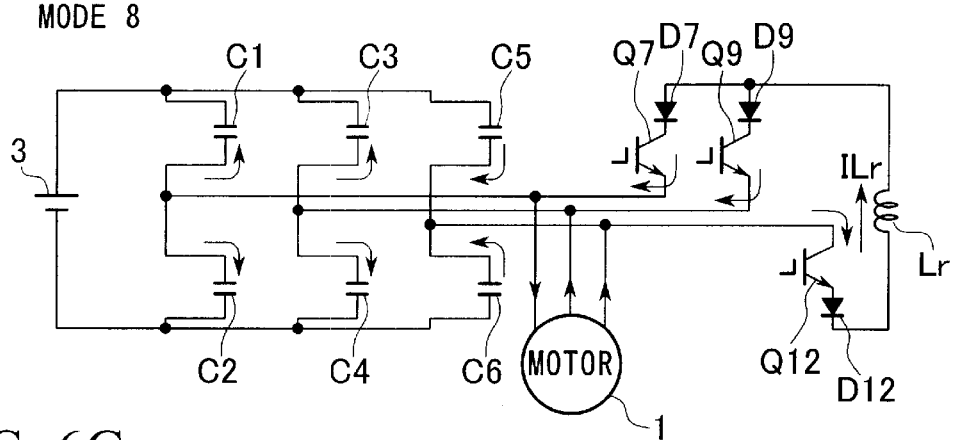
Figure 6C:
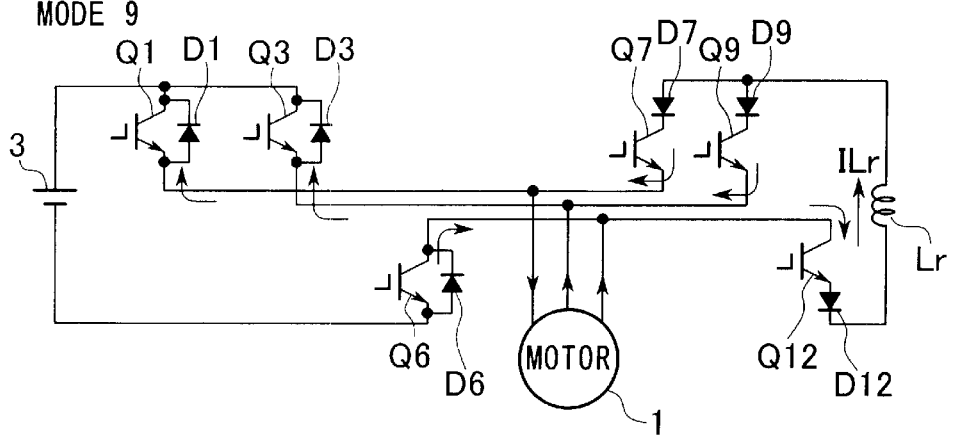
Figure 7:
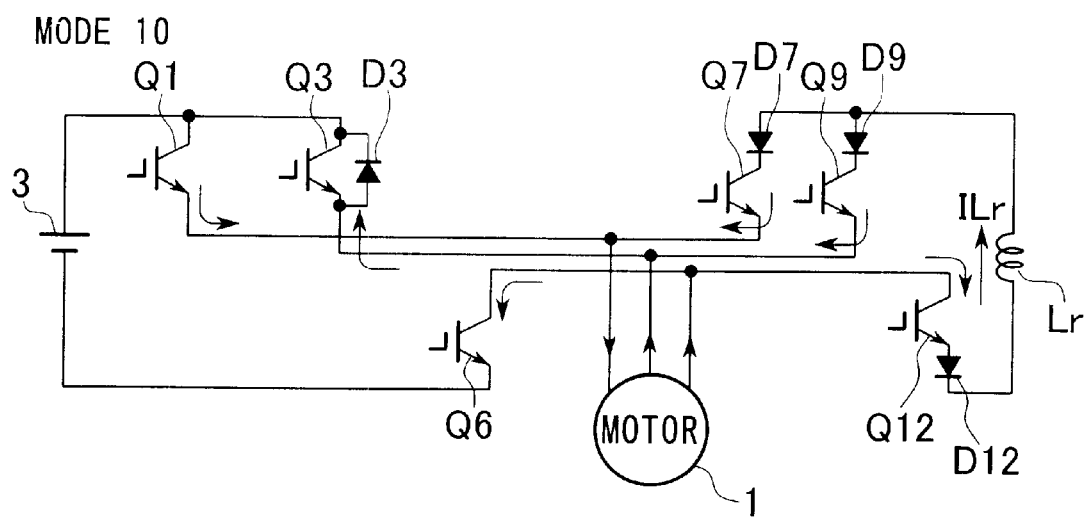
FIG. 7 is a drawing showing the operation for one mode of the inverter circuit of the same embodiment.

Furthermore, when this resonant mode continues, more resonant current flows due to the energy accumulated in the resonant inductor Lr, and at the point in time that all terminal voltages V21, V3 and V6 of the snubber capacitors C1, C3 and C6 have fallen to "zero", the energy accumulated in the resonant inductor Lr flows via the free wheeling diodes D1, D3, and D6, as shown in mode 9 of FIG. 6I.

Next, at time t6, the voltage sensors Vs1, Vs3, and Vs6, which measure the voltage across the collector terminal and emitter terminal of the IGBTs Q1, Q3 and Q6 of the main switching circuit 2A, detect that the voltage across the collector terminal and emitter terminal of the IGBTs Q1, Q3, and Q6 has fallen to "zero", the outputs Z1, Z3, and Z6 of the zero voltage detecting device 8 switches the respective outputs from a logical value of "0" to "1". After receiving this, the drive signal generating device 6 switches the switching control signals S1, S3 and S6 of the IGBTs Q1, Q3 and Q6 of the main switching circuit 2A from a logical value of "0" to "1", the IGBTs Q1, Q3, and Q6 are switched ON, and transits to the stationary mode where the (Us, Vs, Ws), is equal to (1, 1, 0) shown in Mode 10 FIG. 7J.

At this time, at the IGBTs Q1, Q3, and Q6, the voltages V1, V3, and V6 between the collector terminal and the emitter terminal of the IGBTs Q1, Q3, and Q6 is "zero", and due to the state in which the energy accumulated in the inductors flows as current to each of the free wheeling diodes D1, D3 and D5, current does not flow to the IGBTs Q1, Q3, and Q6, and thus ZVS and ZCS in the IGBTs Q1, Q3, and Q6 are realized.

The above explained operation of the inverter circuit is the case that from time t1 to time t6 control is carried out such that (Us, Vs, Ws) changes from (1, 0, 0) to (0, 0, 1), and then in turn changes to (1, 1, 0), but carrying out space vector PWM control in the inverter circuit is identical to the case in which the operation of the inverter circuit in the transition between different control vectors is also controlled such that the above (Us, Vs, Ws) changes from (1, 0, 0) to (0, 0, 1), which then changes to (1, 1, 0).

Moreover, when the main switching elements are separated into first, second, and third upper level switching elements (for example IGBT Q1, Q3, and) corresponding to each phase of the three phase bridge and fourth, fifth, and sixth lower level switching elements (for example, IGBT Q2, Q4, and Q6) corresponding to each phase of the three phase bridge, and the auxiliary switching elements are separated into the seventh, eighth, and ninth switching elements (for example, IGBT Q7, Q9, and Q11 in the embodiment) that are respectively connected to the three phase output terminals that conduct only in the direction in which the current flows to each of the connecting points between the auxiliary switching elements, and the tenth, eleventh, and twelfth switching elements (for example, IGBT Q8, Q10, and Q12) that are respectively connected to the three phase output terminals that conduct only in the direction in which the current flows out from each of the connection points between the auxiliary switching elements, the drive signal generating device 6 outputs switching control signals that force the seventh, eighth, and ninth switching elements (IGBTs Q7, Q8, and Q11) to conduct in synchronism with a three phase control signal that directs the output of a switching control signals that force the first, second, and third switching elements (IGBTs Q1, Q3, and Q5) to conduct, and outputs switching control signals that force the tenth, eleventh, and twelfth switching elements (IGBTs Q8, Q10, and Q12) to conduct in synchronism with the three phase signals that direct the output of switching signals that force the fourth, fifth, and sixth switching elements (IGBTs Q2, Q4, and Q6) to conduct.

However, in order to carry out soft switching, the output of the control vector (Us, Vs, Ws) during the space vector PWM control is defined as follows.

First, in a state wherein IGBTs Q1, A3, and Q5 are all conducting and IGBTs Q2, Q4, and Q6 are all conducting, because the current does not flow to the resonant inductor Lr, soft switching cannot be carried out. Therefore, as shown in FIG. 8A, in the case that Us, Vs, and Ws are respectively each by the logical values "0" and "1", the three phase control signal (three phase control vector) (Us, Vs, Ws) can only be output when the logical exclusive OR of Us, Vs, and Ws is the logical value "1".

In addition, in order to carry out soft switching, because the two phases are necessary, one phase during which the current flows to the resonant inductor Lr and the other phase during which it flows out, state transitions necessarily having two or more phases must be carried out, and thus among the three phases, the state transitions between vectors in which only the state of one phase changes are excluded. Therefore, as shown in FIG. 8B, in the case that the Us, V, and Ws of a control signal is represented by the logical values "0" and "1", the transition of the control vector (Us, Vs, Ws) of the three phase control signal can transition only in the case that the logical OR of the Us, Vs, and Ws are identical. For example, the control vectors (0, 0, 1), (1, 0, 0), and (0, 1, 0) can transit between one another, and similarly, the control vectors (0, 1, 1), (1, 1, 0), and (1, 0, 1) can transit between one another. In addition, as shown in FIG. 8C, in the case that the Us, V, and Ws of a control signal is represented by the logical values "0" and "1", the transition of a control vector (Us, Vs, Ws) of a three phase control signal is possible with signals represented by the logical inversion of Us, Vs, and Ws. For example, the control vectors (0, 0, 1) and (1, 1, 0), or (0, 1, 0) and (1, 0, 1), or (1, 0, 0) and (0, 1, 1) can each transit between one another.

In addition, FIG. 9 is a drawing showing the time relationship between each of the control signals of the inverter control apparatus of the present embodiment, and as shown by the time width T1 in FIG. 9, the minimum time width of a three phase control signal during PWM control is the time width during which the induced current Lr flows. In other words, while current is flowing to the inductor Lr, the three phase control signal output from the control CPU 5 does not change.

In addition, the auxiliary switch-on continuation maximum time Tw during which each of the auxiliary switching elements IGBTs Q7 to Q12 of the auxiliary switching circuit 2B are in a conductive state is the time interval during which the induced current flows when, among the three phases of the load current, a maximum current is flowing. In other words, ZVS and ZCS can be realized during the switching of the turn ON time and the turn OFF time in the auxiliary switching elements by forcing the auxiliary switching elements connected to the inductor Lr to conduct only while the inducted current due to the energy accumulated in the inductor Lr is flowing.

Therefore, in order to carry out PWM control at high speed, in the case that the time width of the three phase control signal is longer than the auxiliary switch-on continuation maximum time, the auxiliary switching elements IGBTs Q7 to Q12 of the auxiliary switching circuit 2B is turned OFF in the auxiliary switch-on continuation maximum time, and in addition, in the case that the time width of the three phase control signal is shorter than the auxiliary switch-on continuation maximum time, the auxiliary switching elements IGBT Q7 to Q12 is turned OFF in the three phase control signal time width.

As described above, according to the first embodiment of the present invention, in a control apparatus for an inverter circuit that reduces the number of resonant inductors, in order to control the electrical charge and discharge of the six snubber capacitors of the soft switching inverter by using the resonant current flowing to the inductors that form the snubber capacitors and the resonant circuit and the bridge circuit by the six auxiliary switching circuit connected to the inductors, the current flowing to the load and resonant inductors are measured, and thereby the timing of the turning OFF of the main switching elements of the inverter circuit are determined, and a current sensor is provided that measures the current applied to the main switching elements at both terminals of each of the snubber capacitors connected to the main switching elements, and thereby the timing of the turning ON of the main switching elements of the inverter circuit is determined.

Therefore, in an inverter circuit that eliminates one inductor, of which one was conventionally necessary for each phase for a total of three, the zero voltage switching (ZVS) and cero current switching (ZCS) of during the turning ON of the switching elements that form the main switching circuit can be reliably realized, and furthermore, in the auxiliary switching elements, ZVS and ZCS can be realized during both the turning OFF and turning OFF.

Second Embodiment

Figure 10:
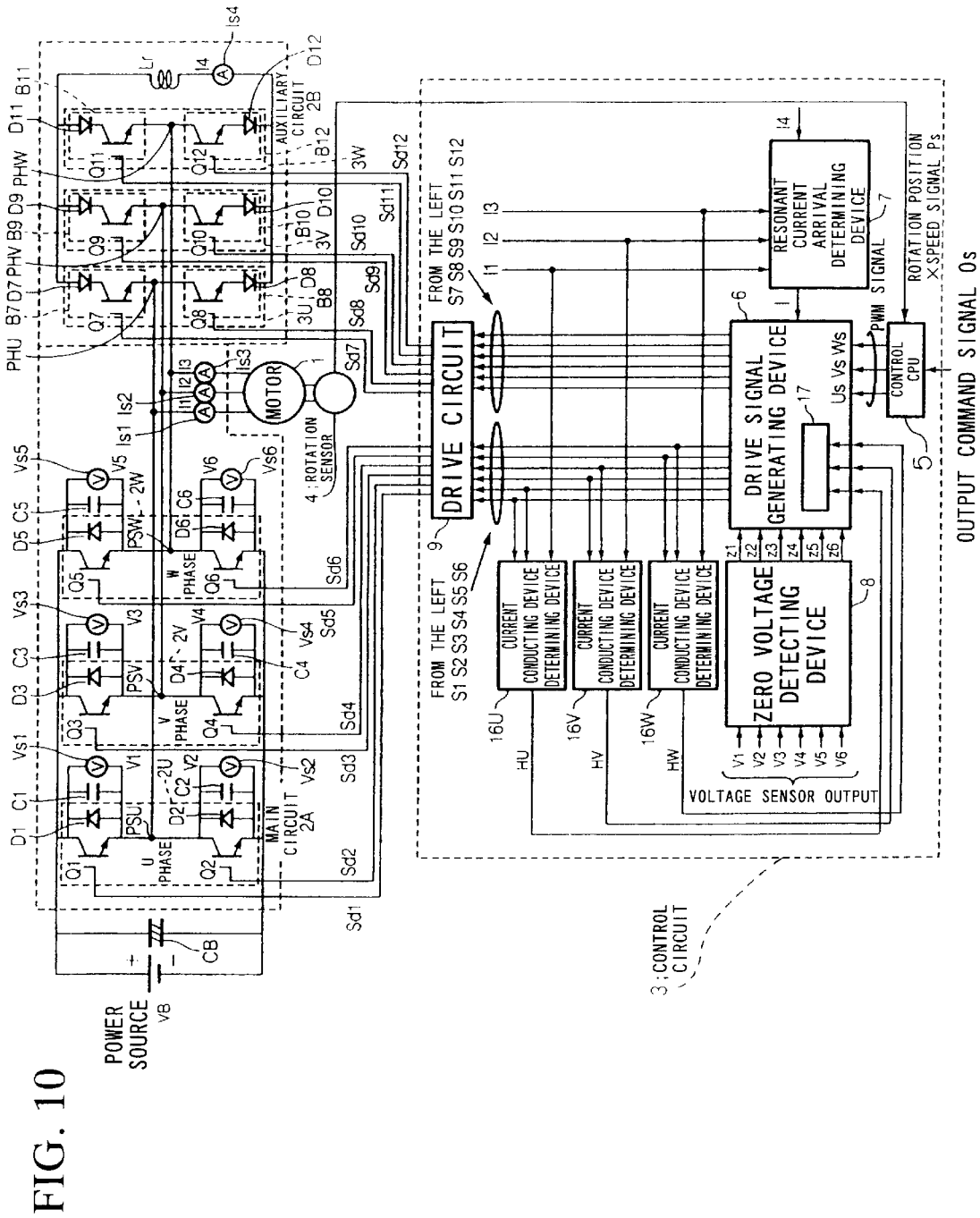
FIG. 10 is a diagram showing the structure of the inverter apparatus according to the second embodiment of the present invention.

FIG. 10 is a circuit diagram showing the structure of an inverter apparatus of the second embodiment of the present invention. The inverter apparatus of the second embodiment has basically a similar structure, so that the same reference numbers are used for the same components as those of the first embodiment shown in FIG. 1. The inverter apparatus according to this embodiment comprises a main circuit 2A in which a direct current output by a power source VB is converted to a three phase alternating current and supplied to a motor 1, an auxiliary circuit 2B that is connected to the output terminal of the main circuit 2A, and a control circuit that controls the auxiliary circuit 2B and the main circuit 2A. Moreover, a smoothing capacitor CB is connected between the plus terminal and the minus terminal of the power source VB.

The main circuit 2A comprises a three phase main circuit, six capacitors C1 to C6, three phase load current sensors Is1, to Is3, and six cross-terminal voltage sensors Vs1 to Vs6.

The three phase main circuit is formed by three main circuits 2U, 2V, and 2W for each phase that are connected in parallel.

The main circuit for the phase 2U is formed by a main switching element Q1 that is connected to the plus terminal of the power source VB, a main switching element Q2 connected to the minus terminal of the power source VB, a diode D1 that is connected in parallel to the main switching element Q1, and a diode D2 that is connected in parallel to a main switching element Q2. Specifically, the main switching elements Q1 and Q2 are IGBTs (insulated gate bipolar transistors). Specifically, the collector of the main switching element Q1 is connected to the plus terminal of the power supply VB, and the emitter of the main switching element Q2 is connected to the minus terminal of the power source VB. The main switching element Q1 and the main switching element Q2 are connected serially at the main connecting point PSU. That is, the emitter of the main switching element Q1 and the collector of the main switching element Q2 are connected at the main connecting point PSU. In addition, the anode of the diode D1 is connected to the emitter of the main switching element Q1, and the cathode of the diode D1 is connected to the collector of the main switching element Q1.

The main circuit for the phase 2V is formed by a main switching element Q3 that is connected to the plus terminal of the power source VB, the main switching element Q4 that is connected to the minus terminal of the power source VB, the diode D3 that is connected in parallel to the main switching element Q3, and the diode D4 that is connected in parallel to the main switching element Q4. Specifically, the main switching elements Q3 and Q4 are IGBT (insulated gate bipolar transistors). Moreover, the connection relationships between the main switching elements Q3 and Q4 and the diodes D3 and D4 in the main circuit for the phase 2V are identical to the main circuit for the phase 2U described above, and thus the explanations thereof are omitted.

The main circuit for the phase 2W is formed by the main switching element Q5 that is connected to the plus terminal of the power source VB, the main switching element Q6 connected to the minus terminal of the power source VB, the diode D5 connected in parallel to the main switching element Q5, and the diode D6 connected in parallel to the main switching element Q6. Specifically, the main switching elements Q5 and Q6 are IGBTs (insulated gate bipolar transistors). Moreover, the connection relationships between the main switching elements Q5 and Q6 and the diodes D5 and D6 in the main circuit for the phase 2W are the same as those for the main circuit for the phase 2U, and the explanations thereof are omitted.

The six capacitors C1 to C6 are connected in parallel to the main switching elements in each of the main circuits 2U, 2V, and 2W for each phase.

Specifically, the capacitor C1 is connected in parallel to the main switching element Q1 in the main circuit for the phase 2U, and the capacitor C2 is connected in parallel to the main switching element Q2 in the main circuit for the phase 2U. That is, the capacitor C1 is connected between the collector and emitter of the main switching element Q1. In addition, the capacitor C2 is connected between the collector and emitter of the main switching elements Q2.

Moreover, the connection relationships between the main switching elements Q3 and Q4 and the capacitors C3 and C4 in the main circuit for the phase 2V are the same as those of the main circuit for the phase 2U described above, and the explanations thereof are omitted. In addition, the connection relationships between the min switching elements Q5 and Q6 and the capacitors C5 and C6 in the main circuit for the phase 2V, and the explanation thereof has been omitted.

The three phase load current sensors Is1 to Is3 detect the load currents I1, I2, and I3 flowing across the main connection points PSU, PSV, and PSW that connect the main switching elements Q1, Q3, and Q5 and the main switching elements Q2, Q4, and Q6 in each of the main circuits 2U, 2V, and 2W for each phase and the motor 1, and outputs the load current signal. That is, the load current sensors Is1 to Is3 are connected between the main connection points PSU, PSV, and PSW that connect to the main switching elements Q1, Q3, and Q5 and the main switching elements Q2, Q4, and Q6 in each of the circuits 2U, 2V, and 3W for each phase. Moreover, the motor 1 is a three phase brushless motor.

The six cross-terminal voltage sensors Vs1 to Vs6 detect the voltage across the main switching elements Q1 to Q6 in each of the circuits 2U, 2V, and 2W for each phase. That is, the cross-terminal voltage sensors Vs1 to Vs6 are connected between the collectors and emitters of the main switching elements Q1 to Q6 in each of the circuits 2U, 2V, 2W for each phase.

The auxiliary circuit 2B comprises a three phase auxiliary circuit, a resonant inductor Lr, and a resonant current sensor Is4.

The three phase auxiliary circuit comprises three auxiliary circuits 3U, 3V, and 3W for each phase that are connected in parallel.

The auxiliary circuit for the phase 3U comprises an auxiliary switching element block B7 that forces a current to flow from the auxiliary circuit 3 and an auxiliary switching element block B8 that forces a current to flow to the auxiliary circuit 3. The auxiliary switching element block B7 and the auxiliary switching element block B8 are connected serially by the auxiliary connection points PHU.

The auxiliary switching element block B7 comprises an auxiliary switching element Q7 and a diode D7. The diode D7 and the auxiliary switching element Q7 are serially connected. Specifically, the auxiliary switching element Q7 is an IGBT (insulated gate bipolar transistor). That is, the cathode of the diode D7 and the collector of the auxiliary switching element Q7 are connected. Therefore, in the auxiliary switching element block B7, current can flow in only one direction.

The auxiliary switching element block B8 comprises an auxiliary switching element Q8 and a diode D8. The auxiliary switching element Q8 and the diode D8 are connected serially. Specifically, the auxiliary switching element Q8 is an IGBT (insulated gate bipolar transistor). That is, the emitter of the auxiliary switching element Q8 and the anode of the diode D8 are connected. Therefore, in the auxiliary switching element block B7, current can flow in only one direction.

In addition, the emitter of the auxiliary switching element Q7 in the auxiliary switching element block B7 and the collector of the auxiliary switching element Q8 in the auxiliary switching element block B8 are connected at the auxiliary connection point PHU. This auxiliary connection point PHU is connected to the main connection point PSU in the main circuit for the phase 2U in the main circuit 2A.

The auxiliary circuit for the phase 3U comprises the auxiliary switching element block B9 and the auxiliary switching element block B10. Moreover, the connection relationships between the auxiliary switching element block B9 and the auxiliary switching element block B10 in the auxiliary circuit for the phase 3U and the internal structure thereof are the same as those of the auxiliary circuit for the phase 3U described above, and the explanation thereof has been omitted.

The auxiliary circuit for the phase 3W comprises the auxiliary switching element block B11 and the auxiliary switching element block B12. Moreover, the connection relationships between the auxiliary switching element block B11 and the auxiliary switching element block B12 in the auxiliary circuit for the phase 3W and the internal structure thereof are the same as the auxiliary circuit for the phase 3U described above, and the explanation thereof has been omitted.

The resonant inductor Lr is connected between the upper terminals of the auxiliary switching element blocks B7, B9 and B11 and the lower terminals of the auxiliary switching element blocks B8, B10, and B12 in each of the auxiliary circuits 3U, 3V, and 3W for each phase. That is, the inductor Lr is connected between the anodes of the diodes D7, D9, and D11 in the auxiliary switching element blocks B7, B9, and B11 and the cathodes of the diodes D8, D10, and D12 in the auxiliary switching element blocks B8, B10, and B12.

The resonant current sensor Is4 detects the resonant current flowing to the inductor Lr. Thereby, the resonant current sensor Is4 is connected serially to the inductor Lr.

The control circuit 3 comprises a zero voltage detecting device 8, a resonant current arrival determination device 7, a control CPU 5, a drive signal generating device 6, a drive circuit 9, and current conducting device determination devices 16U, 16V, and 16W.

The zero current detecting device 8 detects whether or not the cross-terminal voltages V1 to V6 detected by each of the cross-terminal voltage sensors Vs1 to Vs6 in the main circuit 2A are zero, and in the case that they are zero, outputs zero voltage detecting signals z1 to z6 corresponding to each of the cross-terminal voltages V1 to V6.

The resonant current arrival determining device 7 determines whether or not the resonant current I4 detected by the resonant current sensor Is4 in the auxiliary circuit 2B is larger than the load currents I1, I2, and I3 detected by the load current sensors Is1, Is2, and Is3, and in the case that it is larger, outputs the arrival determination signal I.

The control CPU 5 outputs the PWM signals Us, Vs, and Ws based on the output command signal Os that indicates the command value (torque command, speed commands, and the like) to the motor from the operation part (not illustrated) and the rotation position/speed signal Ps output by the rotation sensor 4 that detects the rotation position and speed of the motor 1.

The drive signal generating device 6 outputs the main drive signals S1 to S6 and the auxiliary drive signals S7 to S12 based on the PWM signals Us, Vs, and Ws output by the control CPU 5. The main drive signals S1 to S6 and the auxiliary drive signals S7 to S12 are converted to main drive signals Sd1 to Sd6 and auxiliary drive signals Sd7 to Sd12 by the drive circuit 9.

The main drive signals Sd1, Sd2, Sd3, Sd4, Sd5, and Sd6 respectively are input into the main switching elements Q1, S2, Q3, Q4, Q5, and Q6 in the main circuit 2A, and these main switching elements are switched (turned ON or turned OFF).

The main drive signals Sd7, Sd8, Sd9, Sd10, Sd11, and Sd12 are respectively input into the main switching elements Q7, S8, Q9, Q10, Q11, and Q12 in the main circuit 2B, and these main switching elements are switched (turned ON or turned OFF).

In addition, the drive signal generating device 6 generates main drive signals S1 to S6 that, among the conducting main switching elements, turn OFF the main switching element that is to be made non-conducting next when the resonant current arrival determination device 7 outputs an arrival determination signal I.

In addition, the auxiliary signal generating device 6 generates main drive signals S1 to S6 that, among the non-conducting main switching elements, turn ON the main switching elements that are to be made conductive next when the zero voltage detecting device 8 outputs zero voltage detecting signals z1 to z6, which correspond to each of the cross-terminal voltages V1 to V6.

In addition, the drive signal generating device 6 generates auxiliary drive signals S7 to S12 that turn ON the corresponding auxiliary switching elements Q7 to Q12 in the auxiliary circuit 2A in synchronism with the predefined switching timing of the PWM signals Us, Vs, and Ws output from the control CPU 5.

In addition, the drive signal generating device 9 outputs auxiliary drive signals S7 to S12 that turn OFF the corresponding conducting auxiliary switching elements Q7 to Q12 in the auxiliary circuit 3 after a predetermined continuation time interval has passed from the predefined switching timing of the PWM signals Us, Vs, and Ws output from the control CPU 5.

The current conducting device determining devices 16U, 16V, and 16W, determine whether or not a current is flowing in any of the main switching elements or diodes in each of the main circuits 2U, 2V, and 2W for each phase in the main circuit 2A.

That is, the current conducting device determination device 16U determines whether or not a current is flowing in any of the main switching elements Q1 or Q2 and the diodes D1 and D2 in the main circuit for the phase 2U in the main circuit 2A. The current conducting device determining device 16U inputs main drive signals S1 and S2 that are output by the drive signal generating device 6 and the load current signals output by the load current sensor Is1 in the main circuit 2A, and outputs the current conducting device determination signal HU that indicates the result of the determination. The output current conducting device determining signal HU is input into the drive signal generating device 6.

In addition, the current conducting device determination device 16V determines whether or not a current is flowing in any of the main switching elements Q3 or Q4 and the diodes D3 and D4 in the main circuit for the phase 2V in the main circuit 2A. The current conducting device determining device 16V inputs main drive signals S3 and S4 that are output by the drive signal generating device 6 and the load current signals output by the load current sensor Is2 in the main circuit 2A, and outputs the current conducting device determination signal HV that indicates the result of the determination. The output current conducting device determining signal HV is input into the drive signal generating device 6.

In addition, the current conducting device determination device 16W determines whether or not a current is flowing in any of the main switching elements Q5 or Q6 and the diodes D5 and D6 in the main circuit for the phase 2W in the main circuit 2A. The current conducting device determining device 16W inputs main drive signals S5 and S6 that are output by the drive signal generating device 6 and the load current signals output by the load current sensor Is3 in the main circuit 2A, and outputs the current conducting device determination signal HW that indicates the result of the determination. The output current conducting device determining signal HW is input into the drive signal generating device 6.

The drive signal generating device 6 is built into the resonant operation prohibiting device 17. The resonant operation prohibiting device 17 prohibits the generating of an auxiliary drive signals that turn ON the corresponding auxiliary switching elements in the auxiliary circuit 2B when main switching elements are turned OFF in the case that the current conducting device determination devices 16U, 16V, and 16W have determined that there is a current flowing in the main switching elements.

That is, the resonant operation prohibiting device 17 prohibits the generating of an auxiliary drive signals S7 and S8 that turn ON the corresponding auxiliary switching elements Q7 and Q8 in the auxiliary circuit 2B when this main switching elements Q1 and Q2 are turned OFF in the case that the current conducting device determination devices 16U has determined that there is a current flowing in the main switching elements Q1 or Q2.

In addition, the resonant operation prohibiting device 17 prohibits the generating of an auxiliary drive signals S9 and S10 that turn on the corresponding conducting auxiliary switching elements Q9 and Q10 in the auxiliary circuit 2B when the main switching elements Q3 and Q4 are turned OFF in the case that the current conducting device determination devices 16V has determined that there is a current flowing in the main switching elements Q3 or Q4.

In addition, the resonant operation prohibiting device 17 prohibits the generating of an auxiliary drive signals S11 and S12 that turn ON the corresponding auxiliary switching elements Q11 and Q12 in the auxiliary circuit 2B when this main switching elements Q5 and Q6 are turned OFF in the case that the current conducting device determination devices 16W has determined that there is a current flowing in the main switching elements Q5 or Q6.

Figure 11:
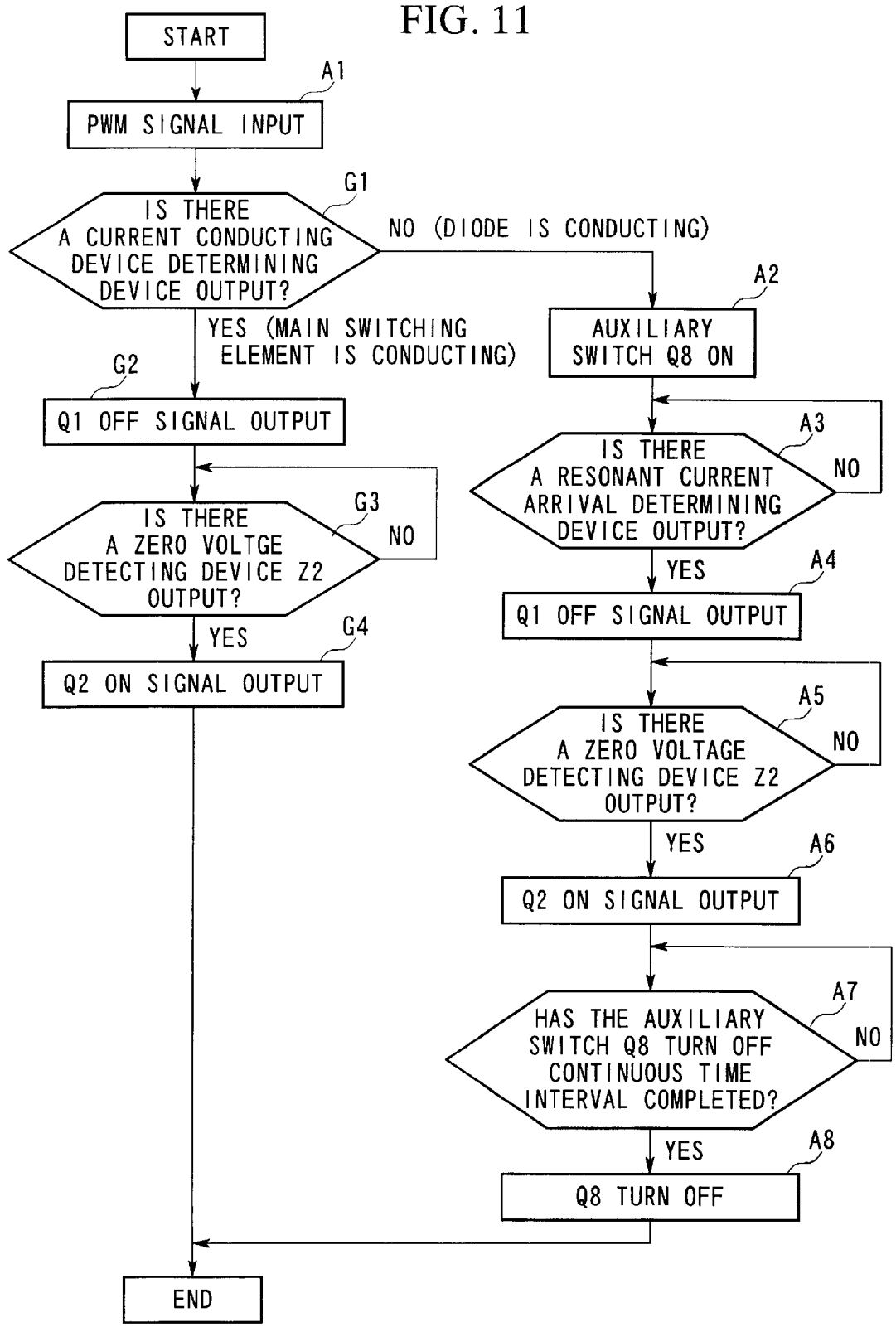
FIG. 11 is a flowchart showing the operation of the inverter apparatus according to the second embodiment of the present invention.

FIG. 11 is a flow chart showing the operation of the inverter apparatus in the embodiment. In a collective resonant snubber inverter, it is necessary to carry out two phase or three phase switching simultaneously. In the case of carrying out two phase simultaneous switching, it is necessary that the collective resonant snubber inverter carry out control so that the operation of the main switching element is switched such that in one phase the plus side main switching element is turned OFF from the ON state and the minus side main switching element is turned ON from the OFF state, while in the other phase, the minus side main switching element is turned OFF from the ON state, an the plus side main switching element is turned ON from the OFF state. In the case of carrying out three phase simultaneous switching, for example, when the plus side main switching element of the first phase is ON and the minus side main switching element is OFF, among the other two phases, the collective resonant snubber inverter must carry out control so that the main switching element is switched so that in one phase (the second phase) the minus side main switching element must be turned OFF from the ON state, and the plus side main switching element turned ON from the OFF state. In the third phase, control must be carried out so that the first phase or the second phase executes the same operation.

In the flowchart, only the operation of one phase among the operations in the case that two phase simultaneous switching is carried out is shown. The explanation of the operation of the other phase is omitted because only the plus side main switching element and the minus side main switching elements are interchanged.

Specifically, the flowchart shows as a representative example, the transitions in the U phase wherein, in the main circuit 2A, Q1 transits from an ON state of an OFF state, Q2 transits from on OFF state to an ON state, Q6 of the W phase transits from an ON state to an OFF state, and Q5 transits from an OFF state to an ON state.

Below, the operation will be explained flowing the flowchart. Moreover, the reference symbols Q1, G1, and the like in the following explanation represent steps in the flowchart.

The control CPU sends the PWM signals Us, Vs, and Ws to the drive signal generating device 6, and transmits to the drive signal generating device 6 commands that, in the U phase, change the plus side main switching element Q I from ON to OFF and change the minus side main switching element Q2 from OFF to ON, and in the W phase, change the plus side main switching element Q5 from OFF to ON, and change the minus side main switching element Q6 from ON to OFF.

The current conducting device determination device detects whether or not a current is flowing to the main switching element (G1). In the case that a current is flowing to the main switching element (YES), the flow proceeds to step G2.

In the case that there is no current flowing to the main switching element, that is, in the case that current is flowing to the diode (NO), the auxiliary switching element Q8 on the inflow side at the U phase of the auxiliary circuit 2B is turned ON (A2). Moreover, the auxiliary switching element Q11 on the outflow side at the W phase of the auxiliary circuit 2B is also turned ON simultaneously.

Next, the resonant current arrival determination device 7 detects whether or not the arrival determination signal I has been output (A3). Moreover, when the resonant current I4 becomes larger than the absolute value of the maximum value among the load currents I1, I2, and I3, the resonant current arrival determination device 7 outputs the arrival determination signal I. If the arrival determination signal I has not been output (NO), then the flow repeats this step.

If an arrival determination signal I has been output (YES), the drive signal generating device 6 sends a drive signal Sd1 to the plus side main switching element Q1 at the U phase of the main circuit 2A, and turns OFF the conducting plus side main switching element Q1 (A4). Moreover, simultaneously, the drive signal generating device 6 sends a main drive signal Sd6 to the minus side main switching element Q6 at the W phase of the main circuit 2A via the drive circuit 9, and turns OFF the conductive minus side main switching element Q6.

Next, the drive signal generating device 6 determines whether or not a zero current detection signal z2 has been output from the zero voltage detecting device 8, that is, detects whether or not the cross-terminal voltage V2 has fallen to zero. If it has not fallen to zero (NO), this step is repeated.

If it has fallen to zero (YES), the conducting minus side main switching element Q2 at the U phase of the main circuit 2A is turned ON (A6). Moreover, when the cross-terminal voltage V5 has fallen to zero, at the W phase of the main circuit 2A, the plus side main switching element Q5 that is to be made conducting next is turned ON.

Next, the drive signal generating device 6 detects at the U phase whether or not the ON continuous interval time of the inflow side auxiliary switching element Q8 of the auxiliary circuit 2B has completed (A7). If the ON continuous time interval has not completed (NO), this step repeats.

When the ON continuous interval time has completed (YES), the conducting inflow side auxiliary switching element Q8 is turned OFF at the U phase of the auxiliary circuit 2B (A8). Moreover, the conducting outflow side auxiliary switching element Q11 at the W phase of the auxiliary circuit 2B is simultaneously turned OFF.

In step G1, in the case that current is flowing to the main switching element (YES), the flow proceeds to step G2, and the drive signal generating device 6 sends a drive signal Sd1 to the plus side main switching element Q1 at the U phase of the main circuit 2A, and turns OFF this conducting plus side main switching element Q1. Moreover, simultaneously, the drive signal generating device 6 sends a main drive signal Sd6 to the minus side main switching element Q6 at the W phase of the main circuit 2A via the drive circuit 9, and turns OFF the conducting minus side main switching element Q6.

Next, the drive signal generating device 6 detects whether or not the zero voltage detecting signal z2 has been output from the zero voltage detecting device 8, that is, whether or not the cross-terminal voltage V2 has fallen to zero. If it has not fallen to zero (NO), this step is repeated.

When it has fallen to zero (YES), the minus side main switching element Q2 at the U phase of the main circuit 2A that is to be made conducting next is turned ON (G4). Moreover, when the cross-terminal voltage V5 becomes zero, the plus side main switching element Q5 at the W phase of the main circuit 2A that is to be made conductive next is turned ON.

As described above, in the case that current is flowing to the main switching elements, when the main switching elements Q1 and Q6 through which current is being conducted are turned OFF, control is carried out so that turning ON the corresponding auxiliary switching elements Q8 and Q11 in the auxiliary circuit 2B is prohibited.

Figure 12:
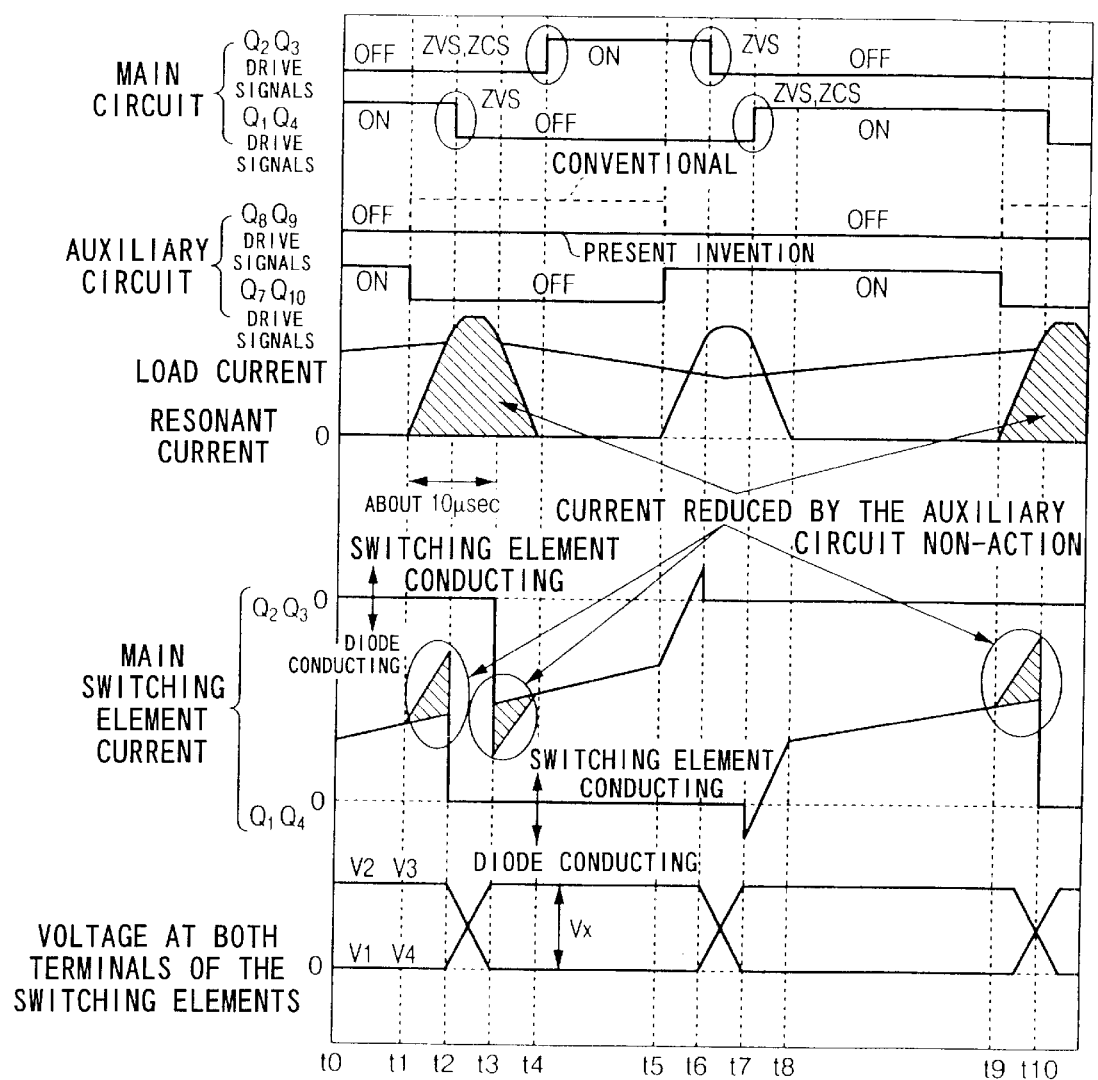
FIG. 12 is a timing chart showing the operation of the inverter apparatus according to the second embodiment of the present invention.

FIG. 12 is a timing chart showing the operation of the inverter apparatus in the embodiment. Moreover, for the sake of simplicity, in the timing chart, operation as a single phase circuit with only the U phase and the V phase is shown.

For example, in the time interval from time t0 to t1, because a current is flowing to the main switching elements Q1 and Q4, the resonant operation prohibiting device 17 determines that a current is being conducted into the main switching elements Q1 and Q4 based on the current conducting device determination signals HU and HV from the current conducting device determination device 16U and 16V, and the auxiliary switching elements Q8 and Q9 corresponding to these main switching elements Q1 and Q4 are not turned ON at time t1. Therefore, conventionally the auxiliary switching elements Q8 and Q9 were not turned ON from time t1 to time t5, but in the present invention, because the off continues the resonant current does not flow, and because an unnecessary current does not flow to the main switching elements, the current that would be consumed in the conventional method by the auxiliary circuit 2B is reduced. In addition, at time t2, the main switching elements Q1 and Q4 are turned OFF, but at this time, due to carrying out resonant operation of the resonant capacitors C1, C2, C3, and C4 by the energy accumulated in the starter windings of the motor by the inductance component that is a part of in the motor 1, even if the auxiliary circuit 2B is not operated, a ZVS can be realized. In addition, at time t5, because a current does not flow to the main switching elements Q2 and Q3, a current does flow to the diodes D1 and D4 at the stage before time t5, the resonant operation prohibiting device 17 determines that a current is not being conducted into the main switching elements Q1 and Q4 but is being conducted into the diodes D1 and D4 based on the current conducting device determination signals HU and HV from the current conducting device determination devices 16U and 16V. It turns ON the auxiliary switching elements Q7 and Q10 of the auxiliary circuit 2B, the initial current storage accumulation due to the operation of the auxiliary circuit 2B starts, the resonant operation is carried out by the energy accumulated in the inductor Lr of the auxiliary circuit 2B from time t6 to time t7, and the ZVS of the switching elements Q2 and Q3 is realized. From time t7 to time t8, the main switching elements Q1 and Q4 are turned ON, the regenerative operation is carried out, and the resonant current is reduced to zero. Turning ON the main switching elements Q1 to Q4 from time t7 to time t8 is the regeneration state of the accumulated energy of the inductor Lr. Thus, current does not flow to the main switching elements Q1 and Q4 but current does flow to the diodes D1 and D4. Thereby, the switching at this time becomes both ZVS and ZCS.

In addition, from time t9 to time 10, like time t1 to time t2, the resonant operation prohibiting device 17 determines that the current is being conducted into the main switching elements Q1 and Q4 in the stage before time t9, and the operation of the auxiliary circuit 2B is prohibited.

Figure 13:
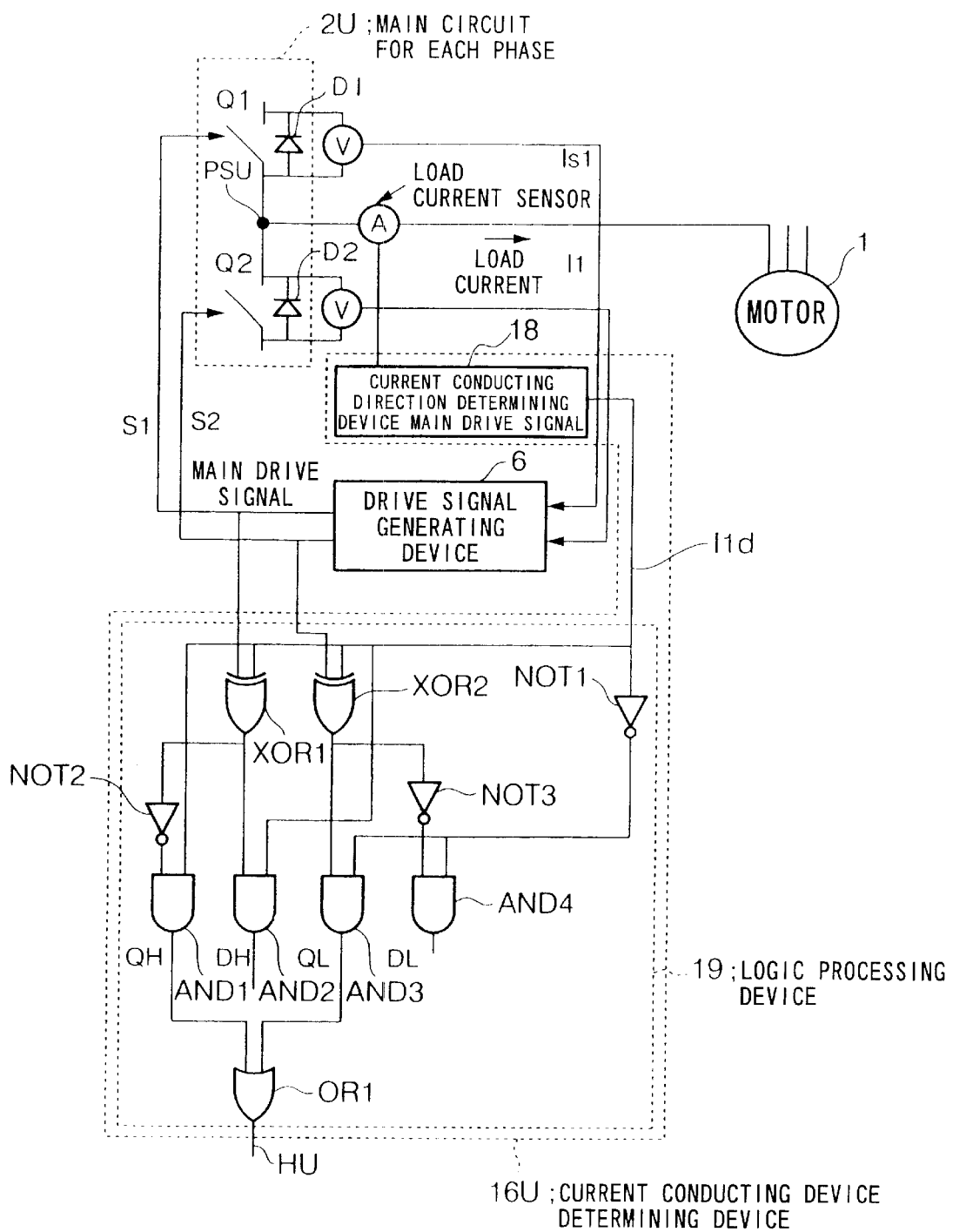
FIG. 13 is a circuit diagram showing the internal constitution of the current conduction device determination device 16U according to the second embodiment of the present invention.

FIG. 13 is a circuit diagram showing the internal structure of the current conducting device determination device 16U. Moreover, because the internal structure of the current conducting device determination apparatuses 16V and 16W is the same, their explanation has been omitted.

The current conducting device determination device 16U determines whether or not a current is flowing in any of the main switching elements Q1 and Q2 or the diodes D1 and D2 in the main circuit for the phase 2U. In order to do this, the current conducting device determination device 16U inputs main drive signals S1 and S2 that cause the switching of the main switching elements Q1 and Q2 in the main circuit for the phase 2U and the load current signal from the load current sensor Is1 that detects the load current I1 that flows across the main connection point PSU in the main circuit for the phase 2U and the motor 1.

The current conducting device detecting device 16U comprises the current conducting direction determination device 18 and the logic processing device 19.

The current conducting direction determining device 18 determines the direction that the load current I1 detected by the load current sensor Is1 is flowing. That is, the current conducting direction determination device 18 inputs the load current signal output from the load current sensor Is1, and outputs the current conducting direction signal I1d. This current conducting direction signal I1d takes the value "1" in the case that a current is flowing from the main connecting point PSU in the main circuit for the phase 2U to the motor 1, and takes the value "0" in the case that a current is flowing from the motor 1 to the main connecting point PSU in the main circuit for the phase 2U.

The logic processing device 19 detects whether or not a current is flowing in any of the main switching elements Q1 and Q2 or the diodes D1 and D2 based on the direction that the load current I1 is flowing and the main drive signals S1 and S2 generated by the drive signal generating device 6. That is, the logic processing device 19 inputs the current conducting direction signal I1d output by the current conducting direction determination device 18 and the main drive signals S1 and S2 output by the drive signal generating device 6, and outputs the current conducting device determination signal HU. Moreover, the main drive signals S1 and S2 input by the logic processing device 19 takes the value "1" in the case that a main switching element is ON and takes the value "0" in the case that a main switching element is OFF. In addition, the current conducting device determination signal HU output by the logic processing device 19 takes the value "1" in the case that a current is flowing to the main switching elements Q1 or Q2 and the value "0" in the case that a current is flowing to the diodes D1 or D2.

The logic processing device 19 comprises the exclusive logical OR gates XOR 2 and XOR 2, the inverters NOT1, NOT2, and NOT3, the logical AND gates AND 1, AND 2, AND 3, and AND 4, and the logical OR gate OR 1.

The current conducting direction signal I1d output by the current conducting direction determining device 18 is input by the exclusive logical OR gates XOR 1 and XOR 2, the inverter NOT 1, and the logical AND gates AND 1 and AND 2. The main drive signals S1 and S2 output by the drive signal generating device 6 are respectively input into the exclusive logical OR gates XOR 1 and XOR 2. The output of the exclusive or gate XOR 2 is input into the inverter NOT 3 and the logical AND gate AND 3. The output of the inverter NOT 1 is input into the logical AND gates AND 3 and AND 4. The output of the inverter NOT 2 is input into the logical AND gate AND 1. The output of the inverter NOT 3 is input into the logical AND gate AND 4. The output of the logical AND gates AND 1 and AND 3 are input into the logical OR gate 1. The current conducting device determination signal HU is output from the logical OR gate OR 1.

Figure 14:
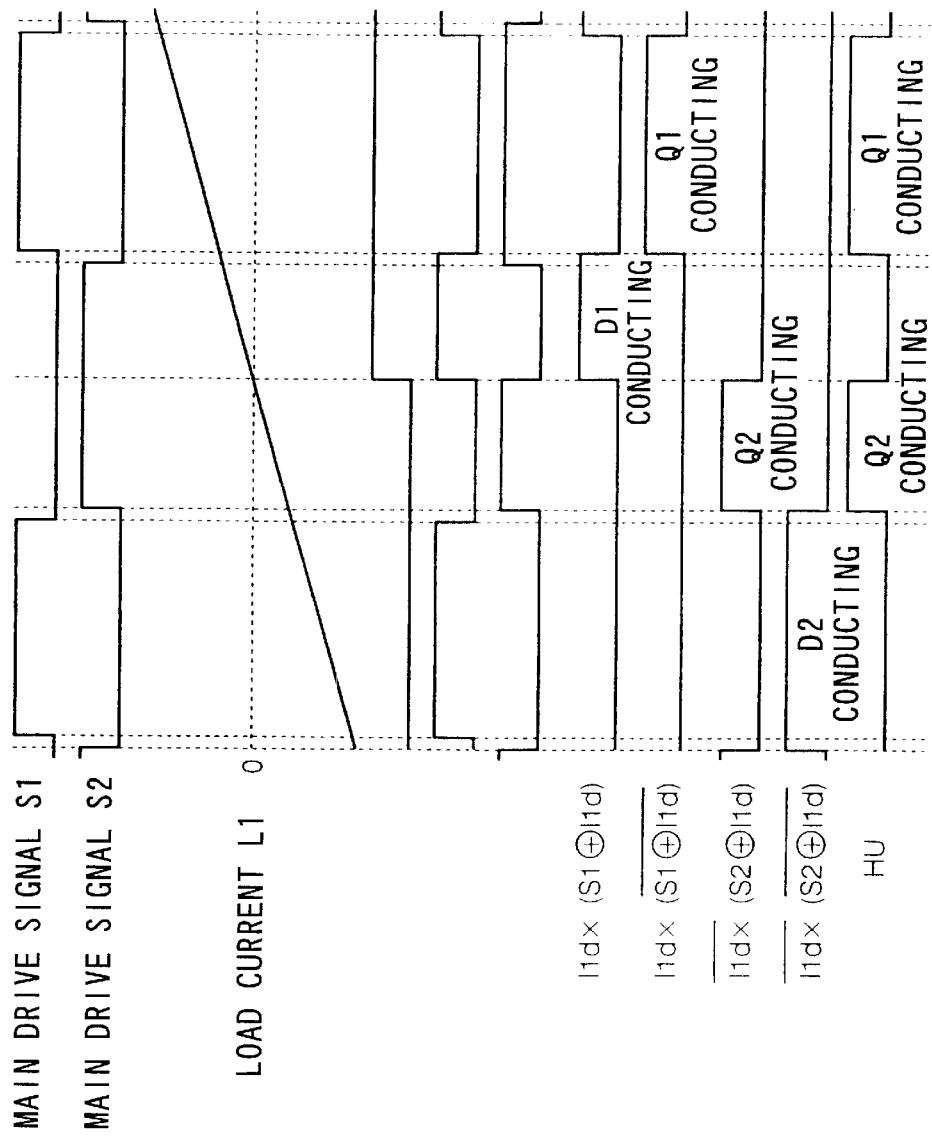
FIG. 14 is a timing chart showing the operation of the current conduction device determination device 16U according to the second embodiment of the present invention.
Figure 15:
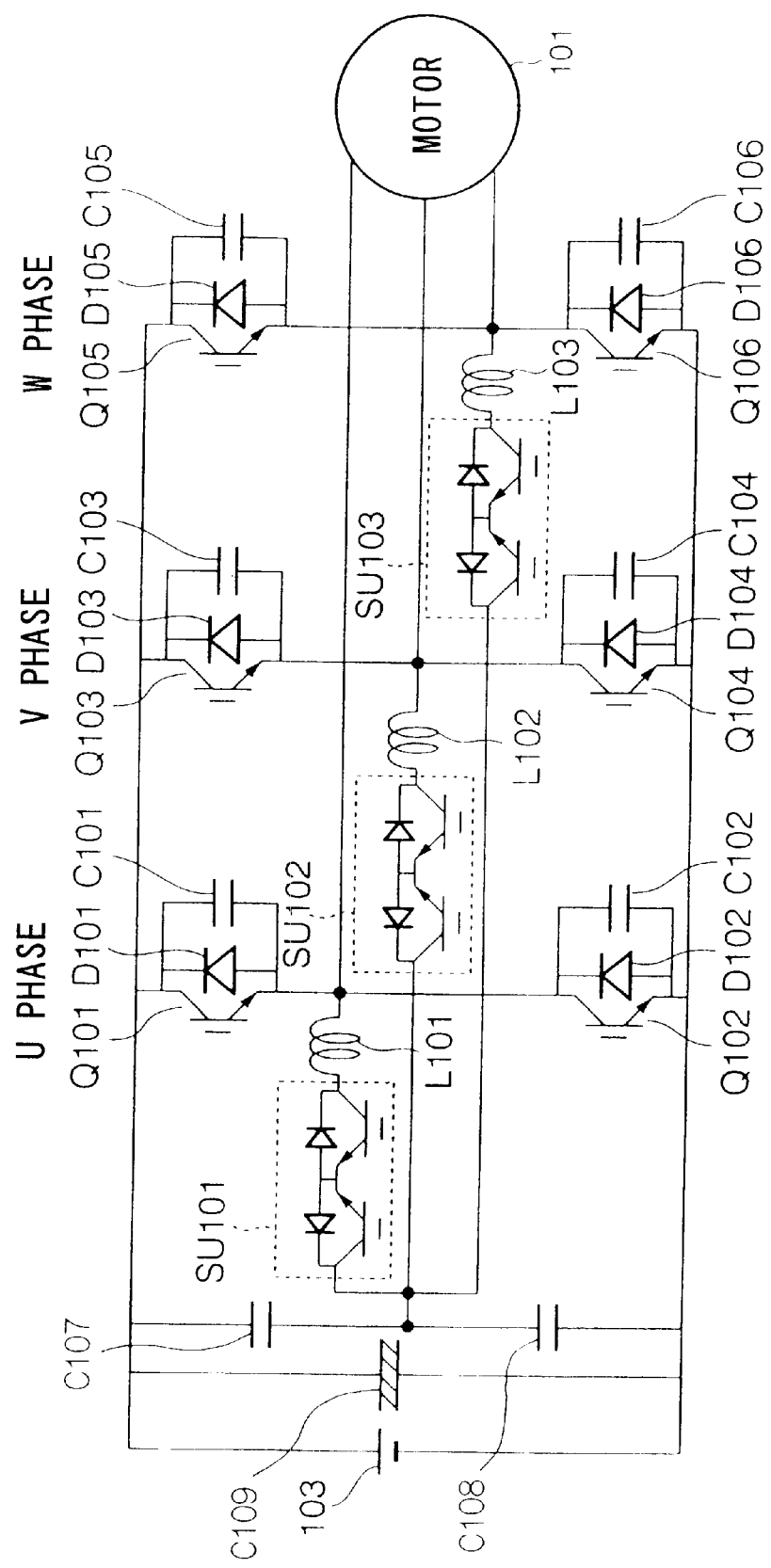
FIG. 15 is a circuit diagram showing a conventional example of a soft switching inverter circuit, that is, the structure of an auxiliary resonant arm-link snubber type circuit.
Figure 16:
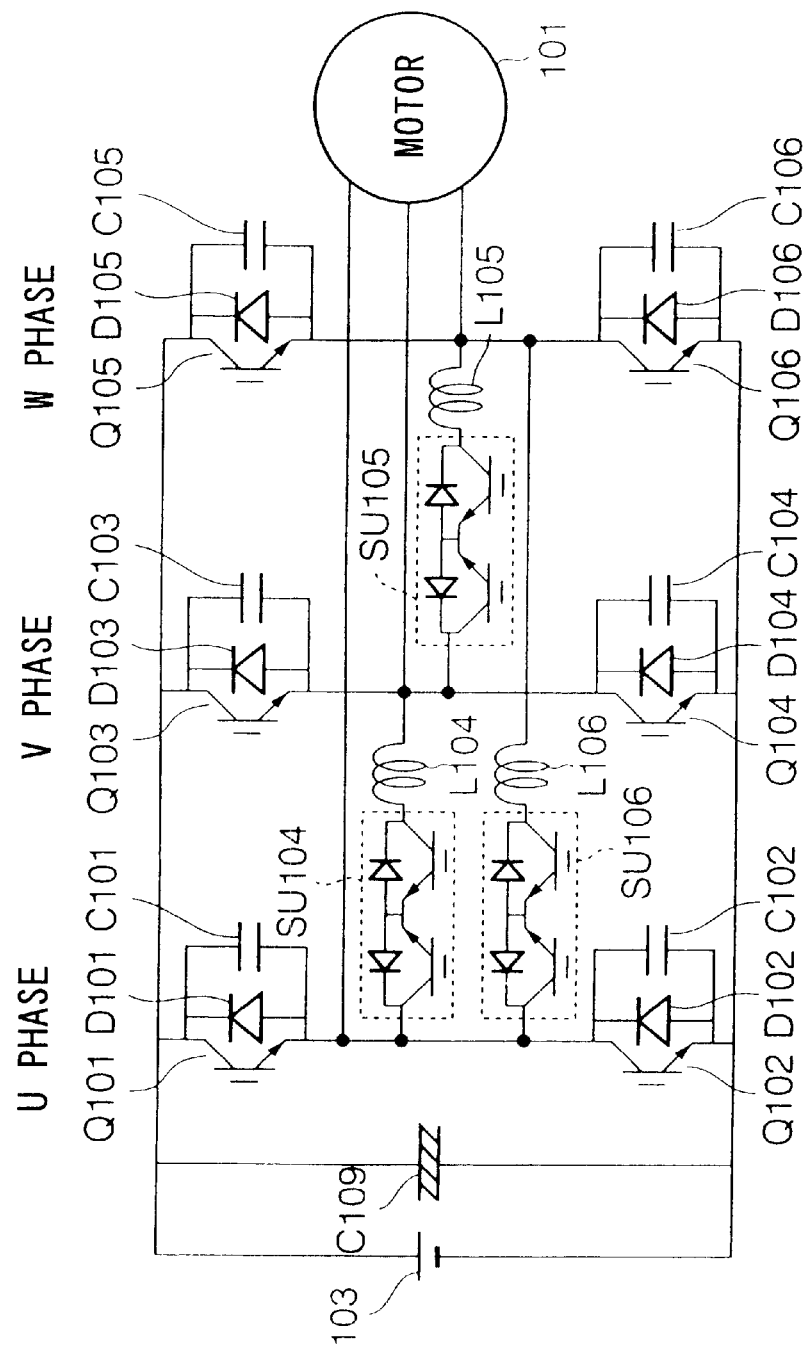
FIG. 16 is a circuit diagram showing a conventional example of a soft switching inverter circuit, that is, a circuit diagram of an auxiliary resonant AC link inverter

FIG. 14 is a timing chart showing the operation of the current conducting device determination device 16U. Moreover, the operation of the current conducting device determination devices 16V and 16W are similar, and thus the explanations thereof are omitted.

In FIG. 13, the exclusive logical OR gate XOR 1 takes the exclusive logical OR of the main drive signal S1 and the current conducting direction signal I1, and the exclusive logical OR gate XOR 2 takes the exclusive logical OR of the main drive signal S2 and the current conducting direction signal I1d. In addition, the logical AND gate AND 1 takes the logical AND of the signal that is the inversion of the output of the exclusive logical OR gate XOR 1 and the current conducting direction signal I1d, and the logical AND gate AND 3 takes the logical AND of the output signal of the exclusive logical OR gate XOR 2 and the signal that is the inversion of the current conducting direction signal I1d. In addition, the logical OR gate OR 1 takes the logical OR of the output signal of the logical AND gate AND 1 and the output signal of the logical AND gate AND 3, and outputs the current conducting device determination signal HU. Due to being structured in this manner, the current conducting device determination device 16U can determine whether or not a current is flowing in the main switching elements Q1 and Q2 in or in the diodes D1 and D2 the main circuit for the phase 2U.

Moreover, in the embodiment described above, three load current sensors were provided, but a structure is also possible wherein there are two load current sensors that detect two phases, where the remaining phase is calculated from the detected values of the two phases. In addition, a three phase induction motor can be used as a motor 1.

According to the second embodiment of the present invention, the current conducting device determining means determines whether or not a current is flowing to either the main switching elements or diodes in each of the main circuits for each phase in the inverter circuit and in the case that the current conducting device determining device determines that a current is flowing to a main switching element, the resonant operation prohibition device prohibits the generation of an auxiliary drive signal that turns ON the corresponding auxiliary switching element in the resonant circuit during the main switching element turns OFF, and thus the conduction loss in the main switching elements, the auxiliary switching elements, and the resonant inductors can be reduced and the efficiency increased.

What is claimed is:

1. A resonant inverter control apparatus that controls an inverter circuit comprising six main switching elements connected to form a three-phase bridge; six free wheeling diodes and six snubber capacitors respectively connected in parallel between two terminals of the main switching elements that are made conductive or non-conductive by the switching control; main switching circuits in which each of the connection points between three groups of main switching circuits that form each phase of a three phase bridge structure connected serially by pairs to each end of a power source serve as three phase output terminals for connecting the motor; and an auxiliary switching circuit in which six auxiliary switching elements that force current to flow in one direction are connected to form a three phase bridge connection and resonant inductors is connected to the bridge circuit that respectively connects each connection point between said auxiliary elements to said three phase output terminals, comprising:

a three phase control device that outputs a three phase control signal that serves as a reference for controlling said main switching elements of said inverter circuit;

six voltage measuring devices that measure the voltage across two terminals of said main switching element;

zero voltage detecting device that detects that the voltage across any two terminal of said six main switching elements is zero by the output of said voltage measuring device;

four current measuring devices that respectively measures the three phase current flowing to said load and the induced current flowing to said inductors;

a resonant current arrival determining device that calculates the absolute value of the maximum value of said three phase current and whether or not the induced current is larger than this maximum value based on the output of said current measuring device; and a drive signal generating device in which a switching control signal that forces conduction across said two terminals of said main switching element is output when the zero voltage detecting device detects that a voltage across said two terminals of the switching elements to be controlled is zero based on the control by said three phase control signal, and a switching control signal that interrupts the conduction across said two terminals of said main switching element that is the phase of the main switching element corresponding to this maximum value and has two terminals in a conducting state is output when said resonant current arrival determining device has determined that said induced current is larger than the absolute value of the maximum value of said three phase current.

2. A resonant inverter control apparatus according to claim 1 wherein:

said main switching elements are separated into first, second, and third upper level switching elements corresponding to each phase of the three phase bridge and fourth, fifth, and sixth lower level switching elements corresponding to each phase of the three phase bridge, and said auxiliary switching elements are separated into the seventh, eighth, and ninth switching elements that are respectively connected to said three phase output terminals that conduct only in the direction in which the current flows to each of the connecting points between said auxiliary switching elements, and the tenth, eleventh, and twelfth switching elements that are respectively connected to said three phase output terminals that conduct only in the direction in which the current flows out from each of the connection points between said auxiliary switching elements, said drive signal generating device outputs switching control signals that force said seventh, eighth, and ninth switching elements to conduct in synchronism with the three phase control signal that directs the output of a switching control signals that force said first, second, and third switching elements to conduct, and outputs switching control signals that force said tenth, eleventh, and twelfth switching elements to conduct in synchronism with said three phase signals that direct the output of switching signals that force said fourth, fifth, and sixth switching elements to conduct.

3. A resonant inverter control apparatus according to claim 1 or claim 2, wherein, for the signal of each phase of said three phase control signal, when the case in which the switching control signal forces conduction across the two terminals of the first, second, and third switching elements and the interrupts the conduction across the two terminals of the fourth, fifth, and sixth switching elements is represented by the logical value "1" and the case in which the switching control signals force conduction across the two terminals of the fourth, fifth, and sixth switching elements and interrupts the conduction across the two terminals of the first, second, and third switching elements is represented by the logical value "0", the exclusive logical OR of the logical values representing said three phase signals of said three phase control signal output by the three phase control device is always the logical value "1".

4. A resonant inverter control apparatus according to claim 3 wherein the state transitions of the three phase control signals output from said three phase control device satisfy either the case that the logical OR of the logical values that represent the signals for each of the phases of said three phase control signals after the state transition are identical to the logical OR of the logical values that represent the signals for each of the phases of said three phase signal after the state transition, or the case in which the logical values that represents the signals of each of the phases of said three phase control signals after state transition are inversions of the logical values representing the signals of each of the phases of said three phase signals after the state transition.

5. A resonant inverter control apparatus according to claim 1 or 2 wherein, when the output time during which said three phase control device continues to output said identical three phase signals is greater than the time during which said induced current flows through said inductors, and the maximum time of the conduction continuation time of said auxiliary switching element is equal to or less than the time during which said induced current flows through said inductors when any of said three phase currents is flowing at a maximum, the drive signal generating device outputs to said auxiliary switching element in a non-conducting state a switching control signal that forces said auxiliary switching element to conduct in synchronism with said three phase control signal that directs the output of a switching control signal to said main switching element, or outputs a switching control signal to said auxiliary switching elements in a conducting state a switching control signal that forces the interruption of conduction of said auxiliary switching elements when the maximum time of the conducting continuation time of said auxiliary switching element has been attained in the case that the output time of said three phase control signal is longer than the maximum time for the conduction continuation time of said auxiliary switching elements, or outputs a switching control signal that forces the interruption of the conduction of said auxiliary switching elements in synchronism with said three phase control signal that directs the output of the switching control signals to said main switching elements in the case that the output time of said three phase control signal is shorter than a maximum time for the conduction continuation time of said auxiliary switching elements.

6. A resonant inverter apparatus comprising an inverter circuit in which a direct current output by a power source is converted to a three phase alternating current and supplied to a three phase motor, a resonant circuit that is connected to the output terminal of the inverter circuit, and a control circuit that control the resonant circuit and the inverter circuit, wherein:

said inverter circuit comprises a three phase main circuit in which three circuits, one for each phase, connected in parallel, wherein a main switching element that is connected to the plus terminal of said power source and the main switching elements that are connected to the minus terminal of the power source are connected in series, and connected in parallel to diodes respectively connected to these two main switching elements; capacitors that are connected in parallel to the main switching elements in each of the circuits for each phase; load current sensors that detect a load current flowing across main connection points, at which two main switching elements in each of the circuits for each phase are connected together, and said motor; and cross-terminal voltage sensors that detect the cross-terminal voltage of the main switching elements in the each of the circuits for each phase;

said resonant circuit comprises auxiliary connection points in which three auxiliary circuits, one for each phase, connected serially to two auxiliary switching elements that allow a current to pass only in one direction are connected in parallel, and two auxiliary switching elements in each of the auxiliary circuits for each phase are connected together; three phase auxiliary circuits connected to the main connection points of said inverter circuit; resonant inductors connected between the auxiliary connection points in said auxiliary circuits for each phase and said terminals on the opposite side; and a resonant current sensor that detects a resonant current flowing to the inductor;

said control circuit comprises a zero voltage detecting device that detects whether or not the cross-terminal voltage detected by each of the cross-terminal voltage sensors is zero and outputs a zero voltage detection signals that corresponds to each of the cross-terminal voltages in the case that they are zero; a resonant current arrival determining device that determines whether or not the resonant current detected by said resonant current sensors is larger than the load current detected by said load current sensors and in the case that they are larger outputs an arrival determination signal; a drive signal generating device that generates a main drive signal that turns OFF the main switching elements to a non-conducting state when the resonant current arrival determination device has output an arrival determination signal, generates a main drive signal that turns ON the main switching elements to a conducting state when said zero voltage detecting device has output a zero voltage detection signal corresponding to each cross-terminal voltage, generates an auxiliary drive signal that turn ON the auxiliary switching elements at a predefined switching timing, and turns OFF an auxiliary switching element that is in a conducting state after a predetermined on continuation time has passed from the predefined switching timing; and current conducting device determining devices that determine whether or not a current is flowing in any of the main switching elements or diodes in each of the circuits for each phase in said inverter circuit; and said drive signal generating device comprises a resonant action prohibiting device that prohibits the generation of an auxiliary drive signal that turns ON a corresponding auxiliary switching element in said resonant circuit during the turn-OFF of the main switching element in the case that said current conducting device determination device has determined that a current is flowing in a main switching element.

7. A resonant inverter apparatus according to claim 6 wherein said current conducting device determining device comprises a current conduction direction determining device that determines the direction that a load current detected by said load current sensor is flowing; and a logic processing device that determines whether or not a current is flowing in any of the main switching elements or diodes in each main circuit for each phase in the inverter circuit based on the direction in which the load current determined by this current conduction direction determining means is flowing and the main drive signal generated by said drive signal generating device.

* * * * *